US011327251B2

(12) United States Patent
Ott

(10) Patent No.: US 11,327,251 B2
(45) Date of Patent: May 10, 2022

(54) UNIVERSAL CABLE ANCHORING FOR PLUG CONNECTORS

(71) Applicant: COMMSCOPE TECHNOLOGIES LLC, Hickory, NC (US)

(72) Inventor: Michael James Ott, Hudson, WI (US)

(73) Assignee: CommScope Technologies LLC, Hickory, NC (US)

( * ) Notice: Subject to any disclaimer, the term of this patent is extended or adjusted under 35 U.S.C. 154(b) by 49 days.

(21) Appl. No.: 16/760,534

(22) PCT Filed: Oct. 30, 2018

(86) PCT No.: PCT/US2018/058139
§ 371 (c)(1),
(2) Date: Apr. 30, 2020

(87) PCT Pub. No.: WO2019/089538
PCT Pub. Date: May 9, 2019

(65) Prior Publication Data
US 2021/0223486 A1 Jul. 22, 2021

Related U.S. Application Data

(60) Provisional application No. 62/578,834, filed on Oct. 30, 2017.

(51) Int. Cl.
*G02B 6/38* (2006.01)
(52) U.S. Cl.
CPC ......... *G02B 6/3889* (2013.01); *G02B 6/3847* (2013.01)

(58) Field of Classification Search
None
See application file for complete search history.

(56) References Cited

U.S. PATENT DOCUMENTS

| 4,874,327 | A  | 10/1989 | Ip |
| 5,615,292 | A  |  3/1997 | Beckwith |
| 7,621,675 | B1 | 11/2009 | Bradley |
| 9,366,837 | B2 |  6/2016 | Claessens et al. |
| 9,684,138 | B2 |  6/2017 | Lu |

(Continued)

FOREIGN PATENT DOCUMENTS

| CN | 1147303 A | 4/1997 |
| CN | 101006374 A | 7/2007 |

(Continued)

OTHER PUBLICATIONS

Notification of the First Office Action for Chinese Patent Application No. 201880068694.9 dated Apr. 14, 2021, 20 pages.

(Continued)

*Primary Examiner* — Jerry Rahll
(74) *Attorney, Agent, or Firm* — Merchant & Gould P.C.

(57) ABSTRACT

One or more cables are axially, laterally, and/or rotationally secured to an anchor member. A plug connector can be assembled to or around the anchor member. The anchor member also can be used to handle the cable prior to assembling the plug connector. A connectorization system for assembling plug connectors includes multiple types/sizes of cables; optionally types/sizes of plug bodies; and the anchor member sized and shaped to connect a selected one of any of the cables with any of the plug bodies of the connectorization system.

19 Claims, 28 Drawing Sheets

(56) References Cited

U.S. PATENT DOCUMENTS

| | | |
|---|---|---|
| 9,989,711 B2 | 6/2018 | Ott et al. |
| 10,345,536 B2 | 7/2019 | Shao et al. |
| 2006/0193562 A1 | 8/2006 | Theuerkorn |
| 2009/0148101 A1 | 6/2009 | Lu et al. |
| 2010/0055970 A1 | 3/2010 | Elsmark et al. |
| 2011/0075974 A1 | 3/2011 | Katagiyama et al. |
| 2012/0243834 A1 | 9/2012 | Yu et al. |
| 2016/0116684 A1 | 4/2016 | Zhang et al. |
| 2016/0187590 A1* | 6/2016 | Lu .......................... G02B 6/387 385/78 |
| 2016/0226203 A1 | 8/2016 | Bradley et al. |

FOREIGN PATENT DOCUMENTS

| | | |
|---|---|---|
| CN | 102460259 A | 5/2012 |
| CN | 103703397 A | 7/2014 |
| WO | 2013/077969 A1 | 5/2013 |
| WO | 2017/106514 A1 | 6/2017 |

OTHER PUBLICATIONS

Extended European Search Report for European Application No. 18873972.6 dated Aug. 16, 2021, 11 pages.
International Search Report and Written Opinion of the International Searching Authority for International Patent Application No. PCT/US2018/058139 dated Mar. 12, 2019, 11 pages.

* cited by examiner

UNIVERSAL CABLE ANCHORING FOR PLUG CONNECTORS

CROSS-REFERENCE TO RELATED APPLICATION

This application is a National Stage Application of PCT/US2018/058139, filed on Oct. 30, 2018, which claims the benefit of U.S. patent application Ser. No. 62/578,834, filed on Oct. 30, 2017, the disclosures of which are incorporated herein by reference in their entireties. To the extent appropriate, a claim of priority is made to each of the above disclosed applications.

BACKGROUND

Plug connectors are typically designed to work with specific cable types. For example, each plug connector is designed to work with a cable having a particular shape and size range. When new cables are designed or existing cables are redesigned to have different sizes and/or shapes, the plug connectors must also be redesigned to accommodate the changes. Redesigned plug connectors must then be put through extensive testing to ensure that the new parts and manufacturing processes meet industry and customer requirements.

Improvements are desired.

SUMMARY

Some aspects of the disclosure are directed to a universal anchor member that can receive various cables having a wide variety of shapes and sizes. Accordingly, when small changes are made to the size and/or shape of the cable, the same anchor member will still be suitable and need not be changed to match. Further, when new types of cables are developed meeting a size threshold, the new cables can be used with the anchor member without modifying the plug connector.

In some implementations, the anchor member is configured to fit within a plug connector. In other implementations, the anchor member forms part of the plug connector.

In certain implementations, the anchor member is configured to receive one or more cables at a receiving region. Adhesive, such as Loctite 3364, is dispensed at the receiving region and cured. The adhesive axially, laterally, and rotationally secures the one or more cables at the receiving region.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
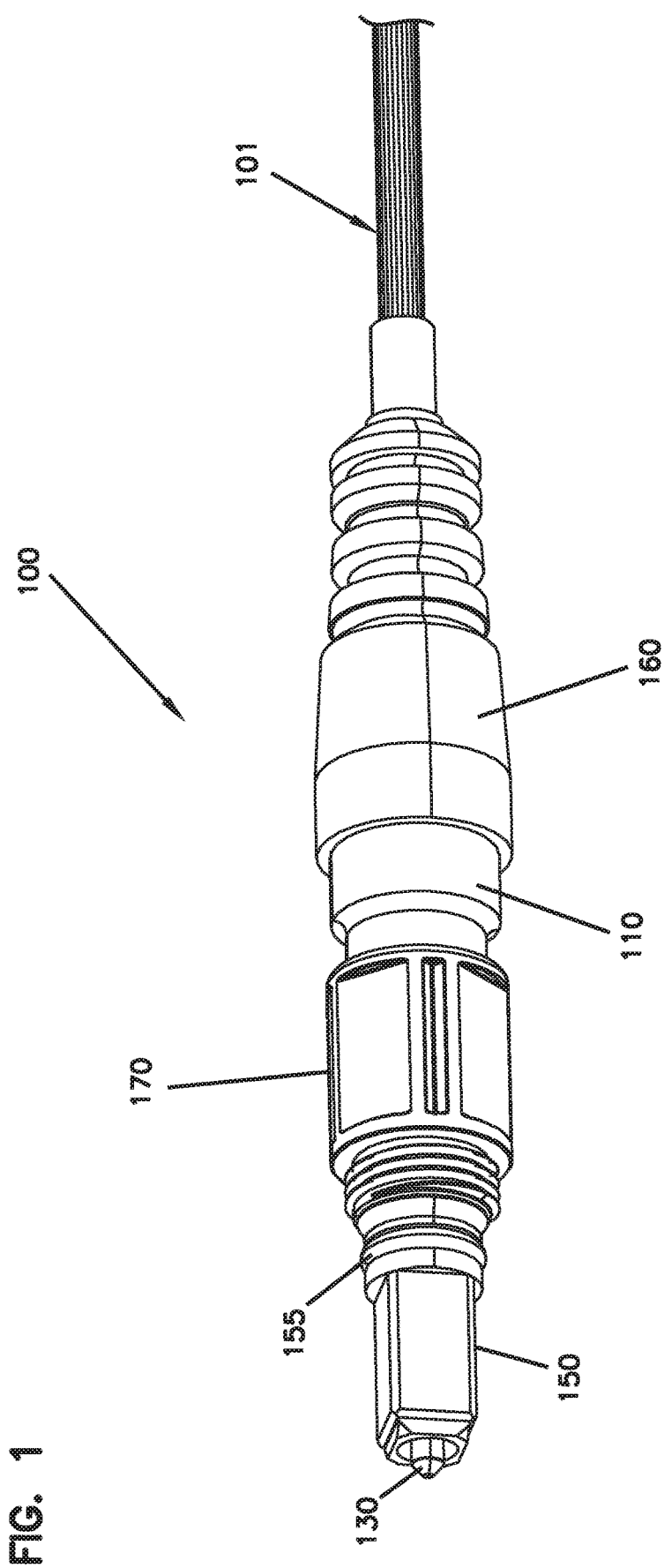
FIG. 1 is a perspective view of a first example connector assembly configured in accordance with the principles of the present disclosure.
Figure 2:
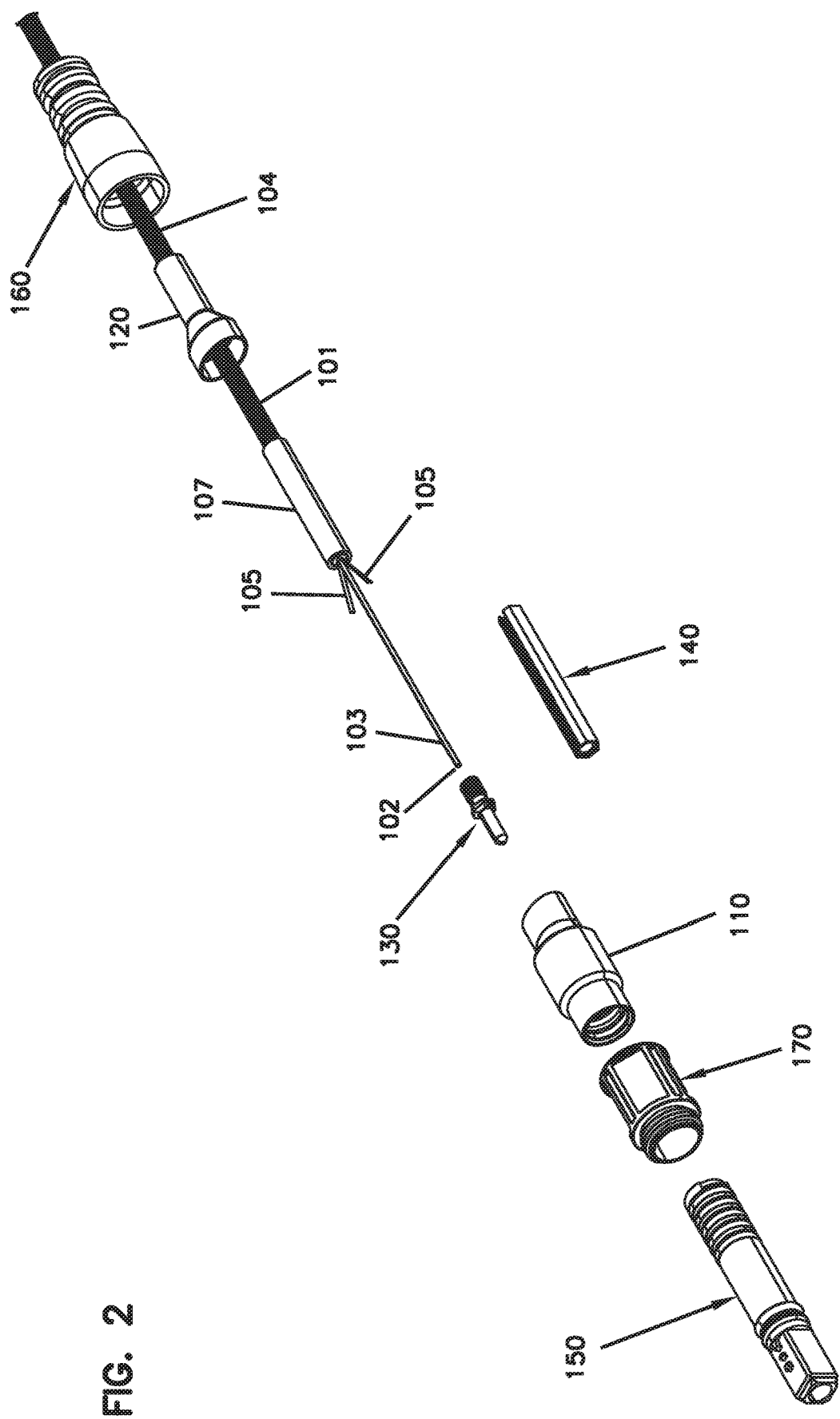
FIG. 2 is an exploded view of the first example connector assembly of FIG. 1.

Reference will now be made in detail to exemplary aspects of the present disclosure that are illustrated in the accompanying drawings. Wherever possible, the same reference numbers will be used throughout the drawings to refer to the same or like parts.

The present disclosure is directed to an anchor member to which one or more cables are axially, laterally, and/or rotationally secured. A plug connector can be assembled to or around the anchor member. The anchor member also can be used to handle the cable prior to assembling the plug connector.

The anchor member defines a through-passage extending between a first open end and a second open end of the anchor member. The first open end defines a receiving region that is sized and shaped to receive a selected one or more of a variety of different types and/or sizes of cables. In certain implementations, any cable or combination of cables that can fit within the receiving region can be secured to the anchor member. The one or more cables can be secured (e.g., axially, laterally, rotationally, or a combination thereof) to the anchor member using adhesive. In particular, the adhesive fills the space between the one or more cables and the receiving region while holding the one or more cables (or components thereof) to the anchor member.

A connectorization system for assembling plug connectors includes an anchor member, a plurality of types of cables, and at least one plug body that couples to a front of the anchor member. At least some of the cables have a different cross-dimensional shape, a different cross-dimensional size, a different number of signal and/or power carriers, or a different strength member composition than others of the cables.

The anchor member defines a through-passage extending between a first end of the anchor member and a second end of the anchor member. The first end of the through-passage defines a receiving region sized and shaped to enable a selected one or more of any of the cables to be received therein. Adhesive is dispensed at the receiving region to hold the selected one or more cables to the anchor member. The adhesive axially, laterally, and/or rotationally secures the selected cable at the receiving region of the anchor member. In certain implementations, the adhesive axially, laterally, and rotationally secures the selected cable at the receiving region of the anchor member.

In certain implementations, the plug body of the connectorization system is one of multiple plug bodies. Each plug body is able to be operationally coupled to the anchor member. Each plug body is associated with at least one of the types of cables. Each cable also is associated with at least one of the plug bodies.

As shown in FIGS. 1, 2, 20, and 21, an end 102 of a cable 101 can be terminated by a connector assembly 100, 200 using an anchor member 110, 210 and one of the plug bodies 150, 250 of the connectorization system. In certain implementations, the connector assembly 100, 200 includes the anchor member 110, 220, a conformable sleeve 120, 220, and the plug body 150, 250. The plug body 150, 250 operationally couples to the anchor member 110, 210 to form a plug connector. The conformable sleeve 120, 220 operationally couples to the anchor member 110, 210 so that the conformable sleeve 120, 220 extends rearwardly from the anchor member 110, 210. The conformable sleeve 120, 220 forms a seal between the anchor member 110, 210 and the cable 101.

In some implementations, the anchor member forms part of the plug housing. For example, the anchor member 110 couples to the plug body 150 so that the anchor member 110 forms the rear of the plug housing. In other implementations, the anchor member is contained within the plug housing. For example, the anchor member 210 may be disposed within a rear plug body 250 that couples to a forward plug body 280.

The connector assembly 100, 200 also may include a strain-relief boot 160, 260 to provide tensile strain relief to the one or more cables 101 as the one or more cables 101 extend rearwardly from the connector assembly 100, 200. For example, the strain-relief boot 160, 260 may be mounted to the second end of the anchor member 110, 210 or to a rear plug body 250. In certain examples, the strain-relief boot 160, 260 may be mounted over the conformable sleeve 120, 220.

In certain implementations, the connector assembly 100, 200 may be hardened (i.e., ruggedized) against the environment. For example, the connector assembly 100, 200 may carry one or more seals 185, 285 (e.g., an O-ring) or may define a sealing surface for abutting against a seal (e.g., an O-ring) disposed at a receptacle for receiving the connector assembly 100, 200. In certain examples, the connector assembly 100, 200 includes a twist-to-lock fastener 170, 270. The twist-to-lock fastener 170, 270 axially and laterally secures to a receptacle or enclosure to hold the connector assembly 100, 200 at the receptacle or enclosure. In an example, the twist-to-lock fastener is threaded (e.g., a rotatable nut having internal or external threads). In another example, the twist-to-lock fastener is a bayonet-style fastener.

The cable 101 includes a signal and/or power carrier 103 surrounded by a jacket 104 or buffer. In some examples, the carrier 103 is a signal carrier. In some such examples, the signal carrier 103 is an optical fiber. In other such examples, the signal carrier 103 is a conductive wire. In other examples, the carrier 103 is a power carrier. In certain implementations, the cable 101 can have multiple carriers 103. In some examples, the carriers 103 are the same type. In other examples, the carriers 103 can be a mix of signal carriers and power carriers. In certain examples, the carriers can be a mix of different types of signal carriers. For convenience, the remainder of this specification will use the term "carrier" to refer to any combination of signal carrier and/or power carrier.

The one or more carriers 103 extend through the anchor member 110, 210 and then a distance forwardly of the anchor member 110, 210 so that the one or more carriers 103 are accessible forward of the first end of the anchor member 110, 210. Before the plug body 150, 250 is attached to the anchor member 110, 210, the carriers 103 can be carried and oriented by a user by the anchor member 110, 210 as will be described in more detail herein.

Figure 20:
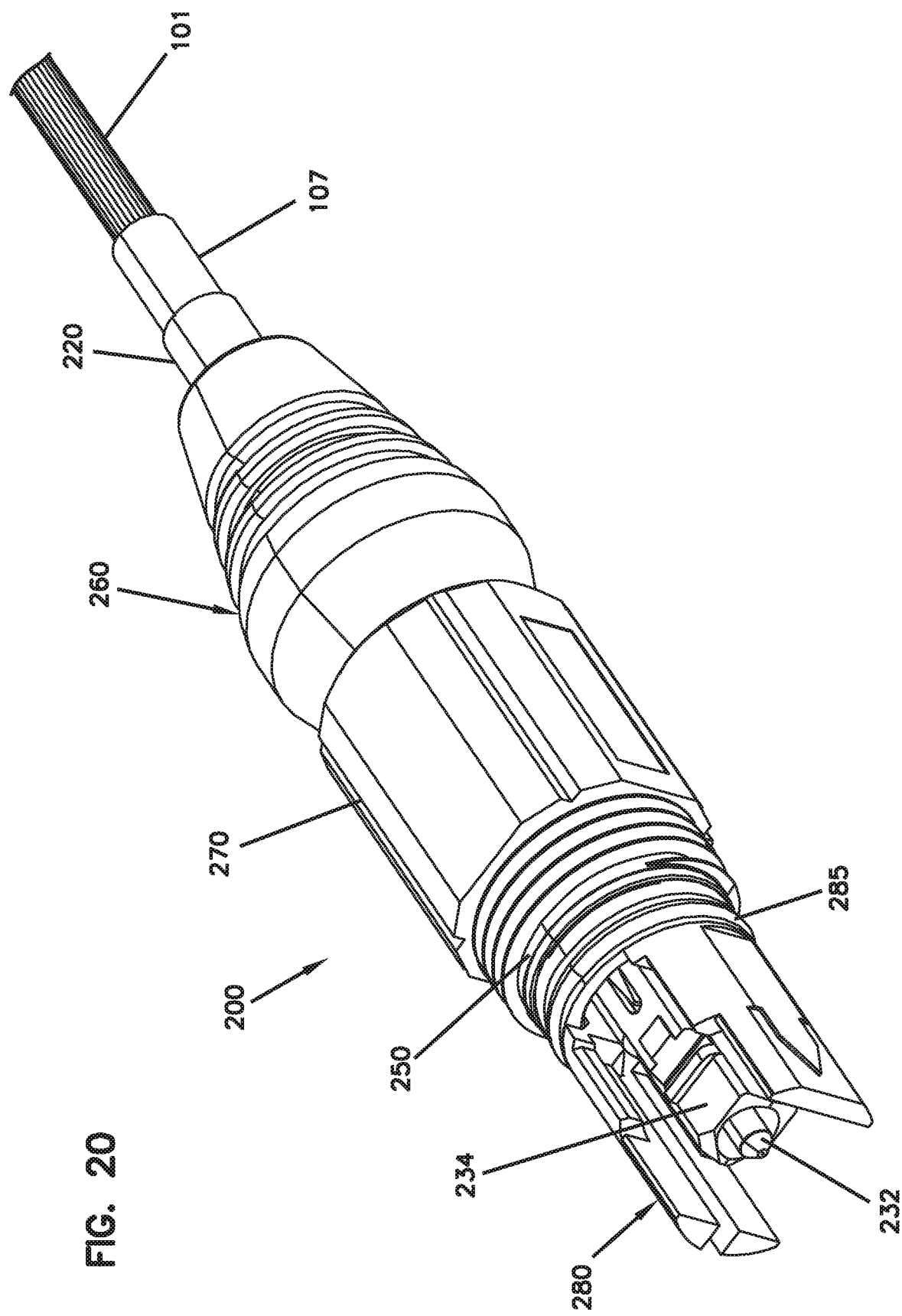
FIG. 20 is a perspective view of a second connector assembly including a second example anchor member configured in accordance with the principles of the present disclosure.

The plug body 150, 250 extends forwardly of the second end 112, 212 of the anchor member 110, 210 to cover a portion of the carrier(s) 103. If the carrier 103 is an optical fiber, then an end face of the optical fiber 103 is accessible at a front of the plug connector housing. For example, a ferrule assembly 130, 230 may be mounted at the forward end 102 of the carrier 103 and coupled to or held within the plug connector housing. In FIG. 1, the ferrule assembly 130 is coupled to the plug connector body 150. In FIG. 20, the ferrule assembly 230 is coupled to a forward plug body 280 that is coupled to the rear plug body 250. If the carrier 103 is a conductive wire, then the conductive wire 103 is electrically coupled within the plug connector housing to an electrical contact carried by the plug connector housing.

In certain implementations, the cable 101 also includes strength members 105 (e.g., tensile strength members). In some implementations, the strength members 105 include aramid yarn, e.g., Kevlar® fibers. In other implementations, the strength members 105 include rigid rods, e.g., glass reinforced plastic (GRP) rods. Other types of strength members also could be used.

Various types of cables 101 have various cross-dimensional sizes (e.g., diameters). Various types of cables 101 also can have various external profiles (e.g., round, flat, oblong, ridged, etc.). In certain implementations, a conformable sleeve 107 can be mounted over an exterior of the jacket 104 to smooth the external profile of the cable 101. In an example, the conformable sleeve 107 includes a thermally recoverable sleeve (i.e., a heat shrink tube) mounted over the cable jacket 104 along a section of the cable 101. In another example, the conformable sleeve 107 includes an elastically deformable sleeve (e.g., a rubber sleeve) stretched over the jacket 104. In certain examples, adhesive can be used to aid in securing the conformable sleeve 107 to the jacket 104.

FIGS. 3-9 illustrate a first example anchor member 110 suitable for use in connectorizing a cable 101 to obtain a connector arrangement 100 shown in FIGS. 1, 2, 18, and 19. FIGS. 22-28 illustrate a second example anchor member 210 suitable for use in connectorizing the cable 101 to obtain a connector arrangement 200 shown in FIGS. 20, 21, 36, and 37. FIGS. 10-19 illustrate the steps of connectorizing a cable 101 using either of the anchor members 110, 210.

Figure 3:
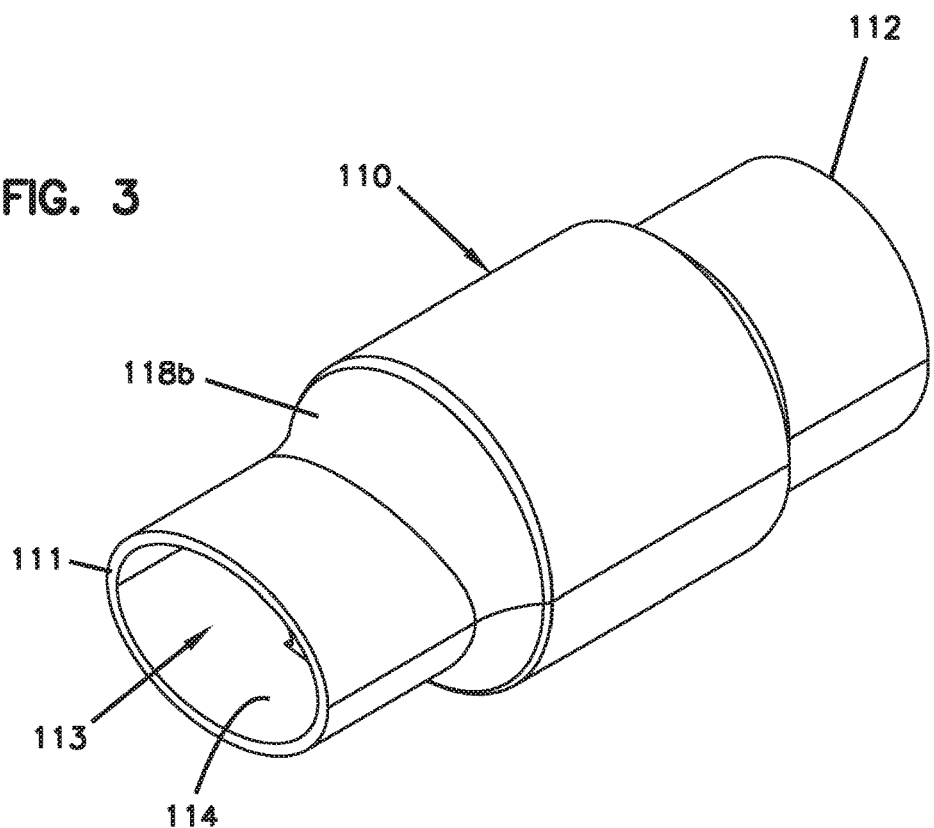
FIG. 3 is a first end perspective view of the first example anchor member suitable for use with the first example connector assembly of FIG. 1.
Figure 4:
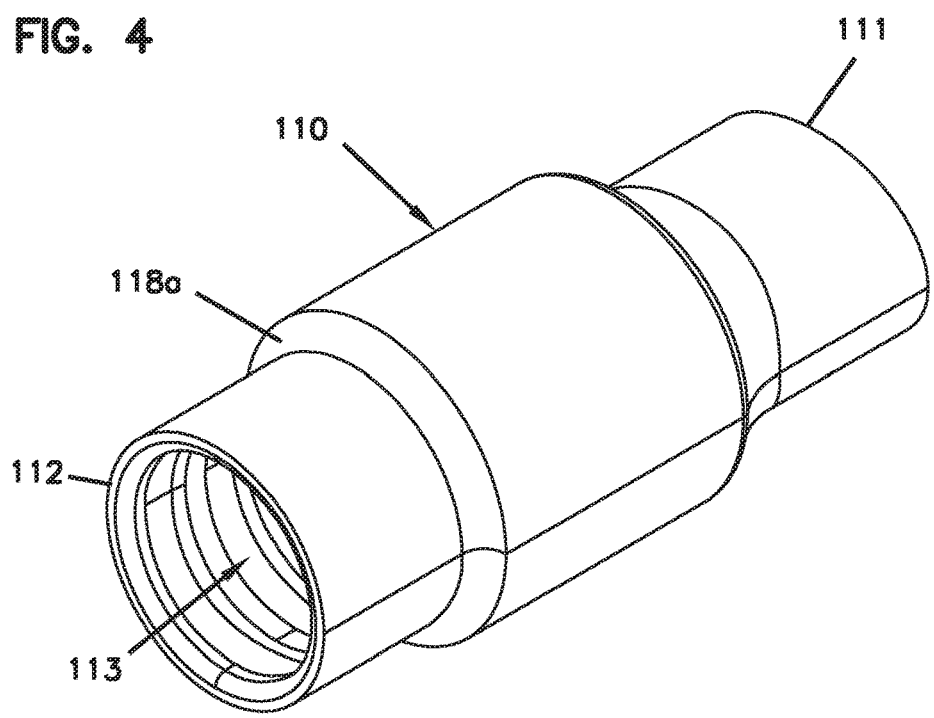
FIG. 4 is a second end perspective view of the first example anchor member of FIG. 3.
Figure 22:
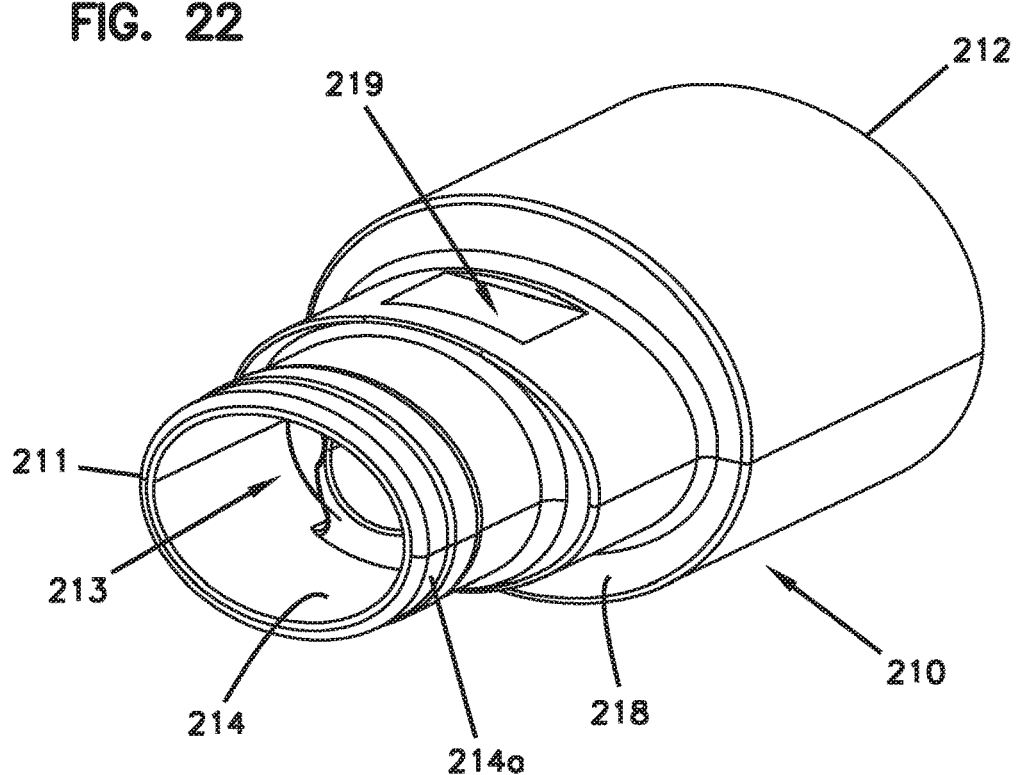
FIG. 22 is a first end perspective view of the second anchor member of FIG. 20.

The anchor member 110, 210 has a body extending between a first open end 111, 211 and a second open end 112, 212 (see FIGS. 3 and 22). A first through-passage 113, 213 is defined by the body to extend between the first and second open ends 111, 112, 211, 212. In certain implementations, the first though-passage 113, 213 fills a majority of an internal volume of the body at the first and second ends 111, 112, 211, 212 (e.g., see FIGS. 6 and 28).

The first through-passage 113, 213 defines a receiving region 114, 214 at the first open end 111, 211 (see FIGS. 3 and 22). A pathway exists between the second open end 112, 212 of the anchor member 110, 210 and the receiving region 114, 214 so that adhesive can be dispensed at the receiving region 114, 214 via the second open end 112, 212. For example, a dispenser (e.g., a needle or nozzle) can be inserted into the anchor member 110, 210 through the second open end 112, 212 and routed through the first through-passage 113, 213 toward the receiving region 114, 214. In certain examples, a fill stop line is marked at an interior of the body of the anchor member 110, 210.

Figure 5:
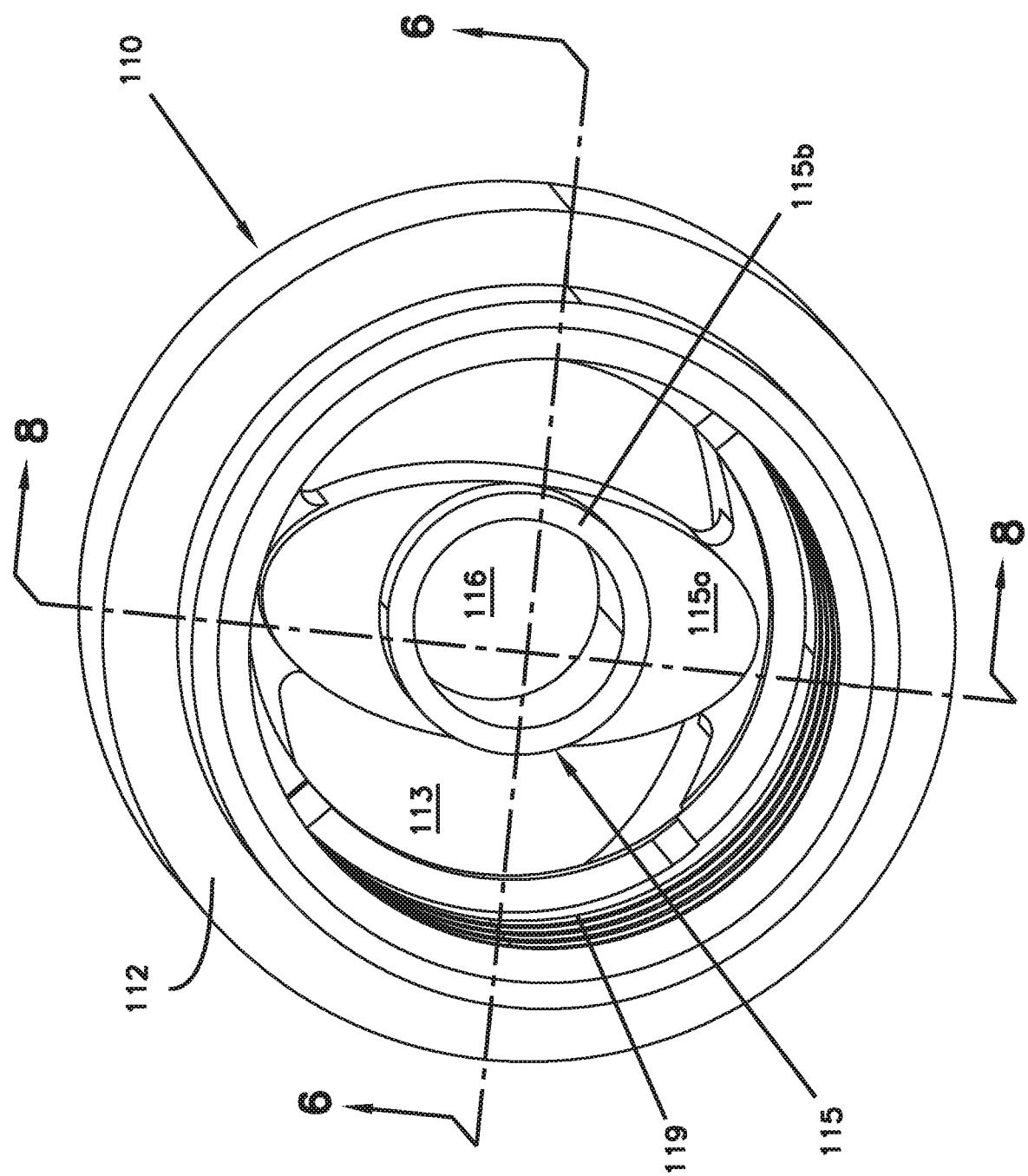
FIG. 5 is a perspective view of the second end the first example anchor member of FIG. 3.
Figure 6:
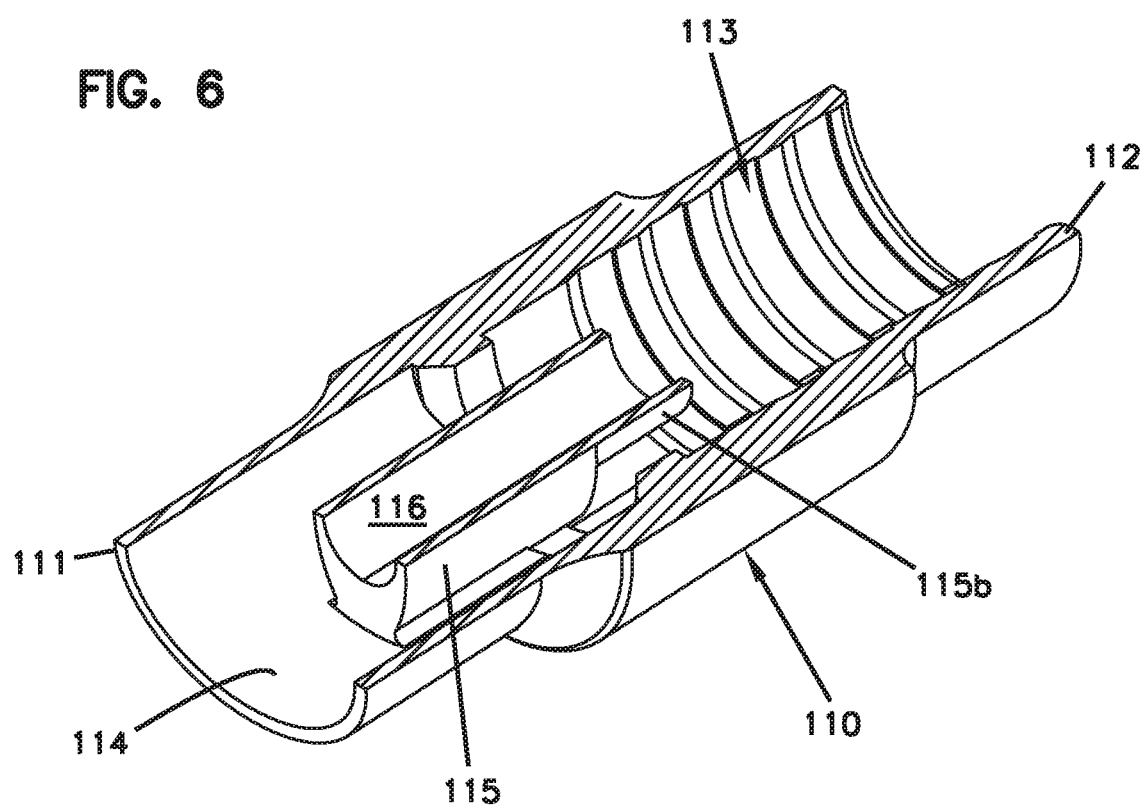
FIGS. 6 and 7 are cross-sectional views of the first anchor member of FIG. 3 taken along the 6-6 line of FIG. 5.
Figure 7:
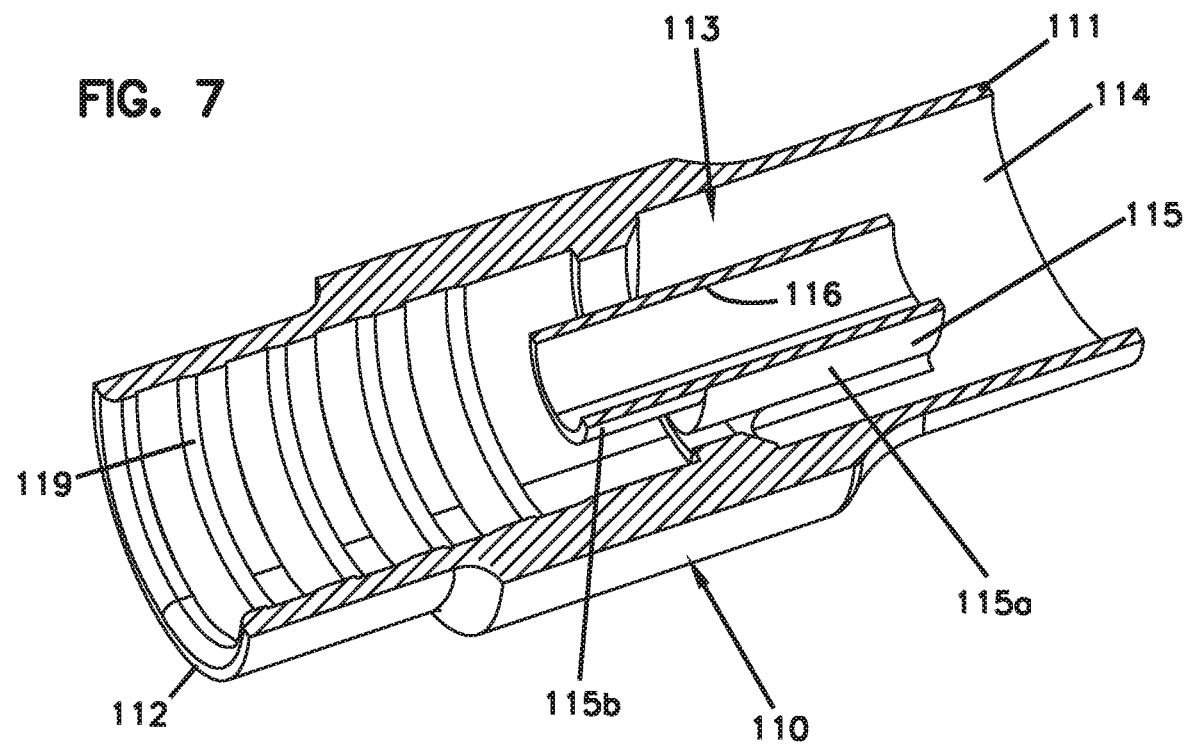
Figure 8:
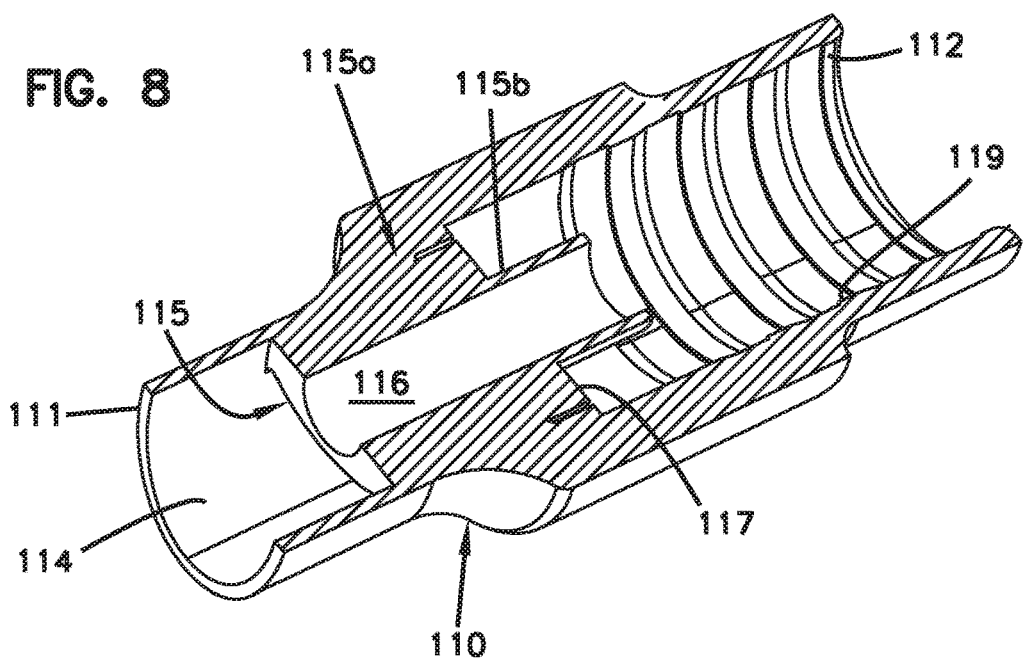
FIGS. 8 and 9 are cross-sectional views of the first anchor member of FIG. 3 taken along the 8-8 line of FIG. 5.
Figure 9:
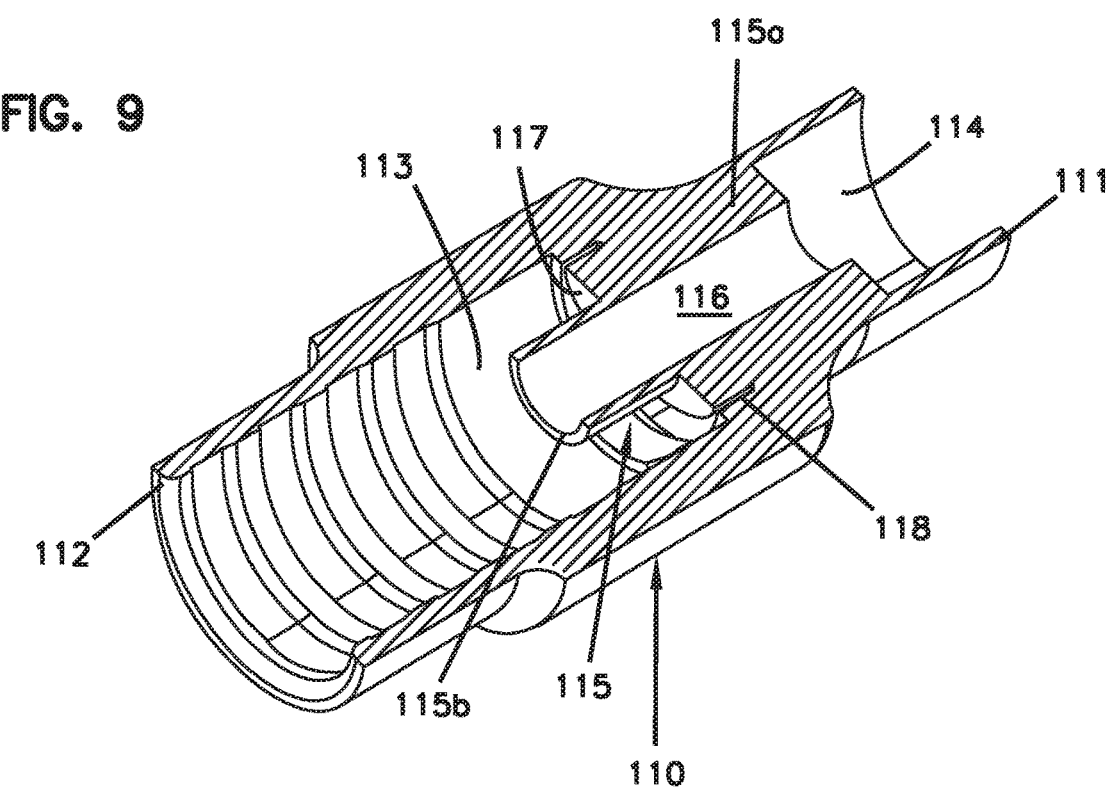
Figure 24:
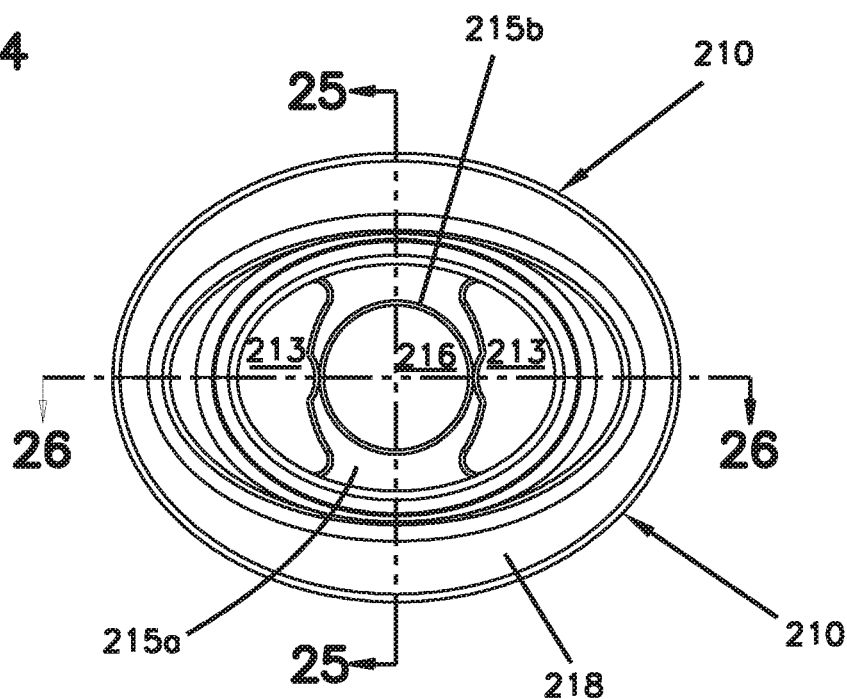
FIG. 24 is an end view of the second anchor member of FIG. 20.
Figure 25:
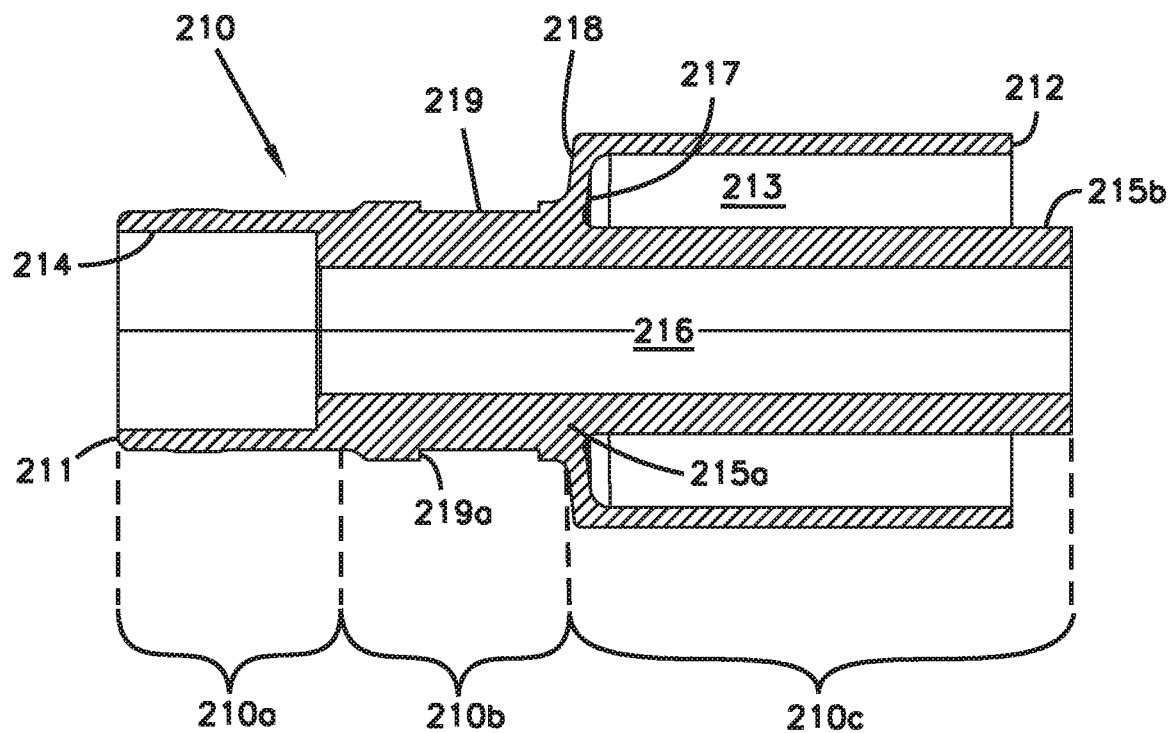
FIG. 25 is a cross-sectional view of the second anchor member of FIG. 20 taken along the 25-25 line of FIG. 24.
Figure 26:
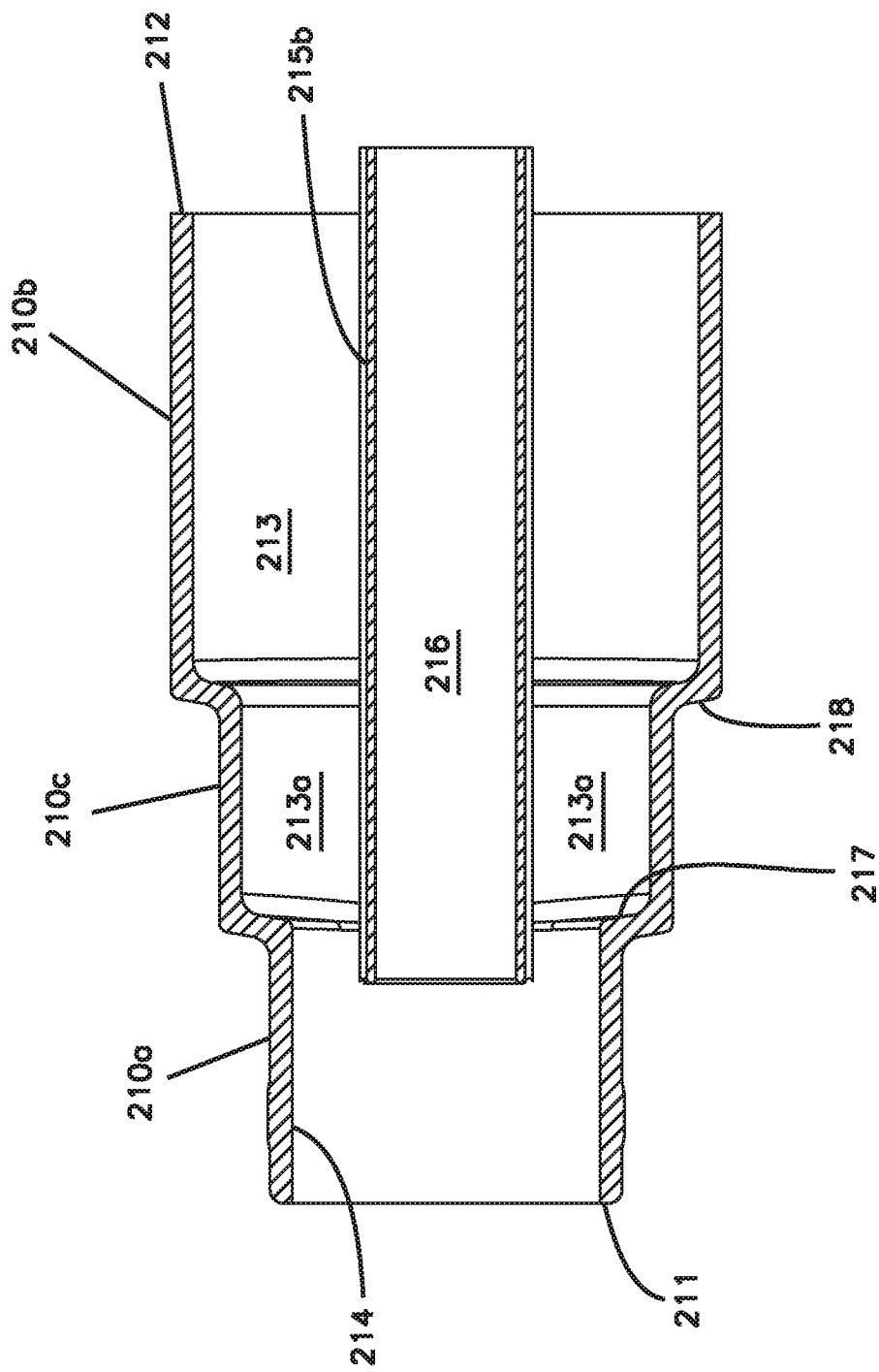
FIG. 26 is a cross-sectional view of the second anchor member of FIG. 20 taken along the 26-26 line of FIG. 24.
Figure 27:
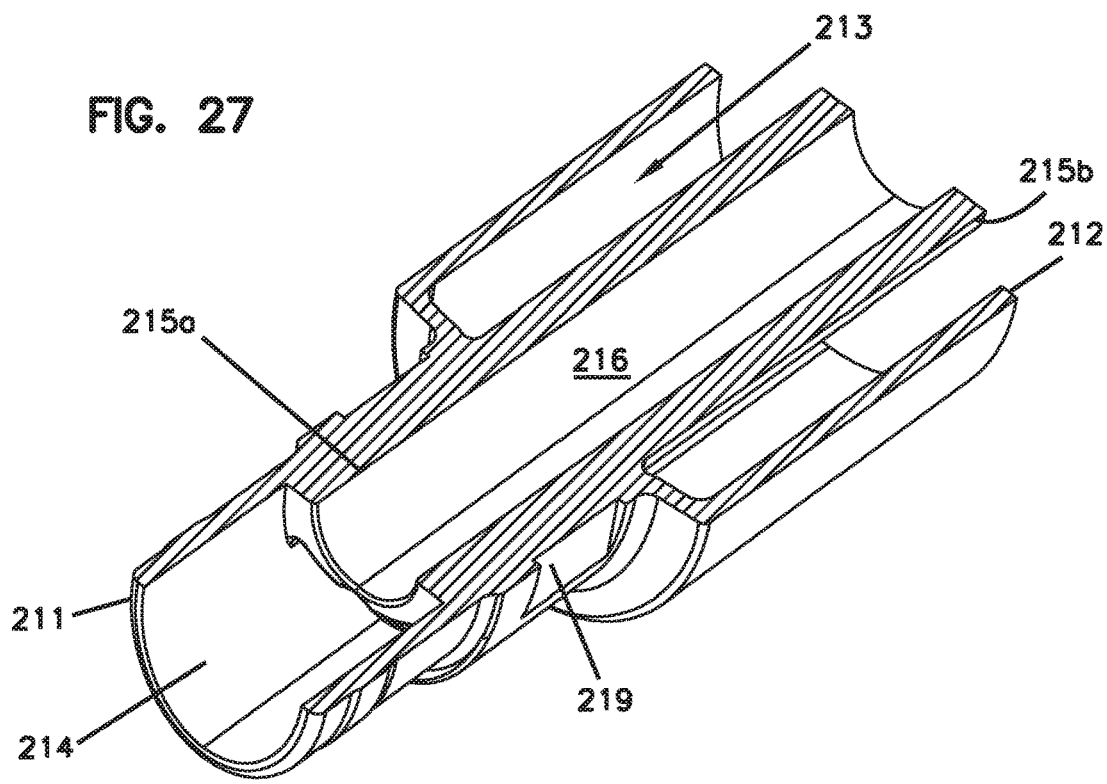
FIG. 27 is a perspective view of FIG. 25.
Figure 28:
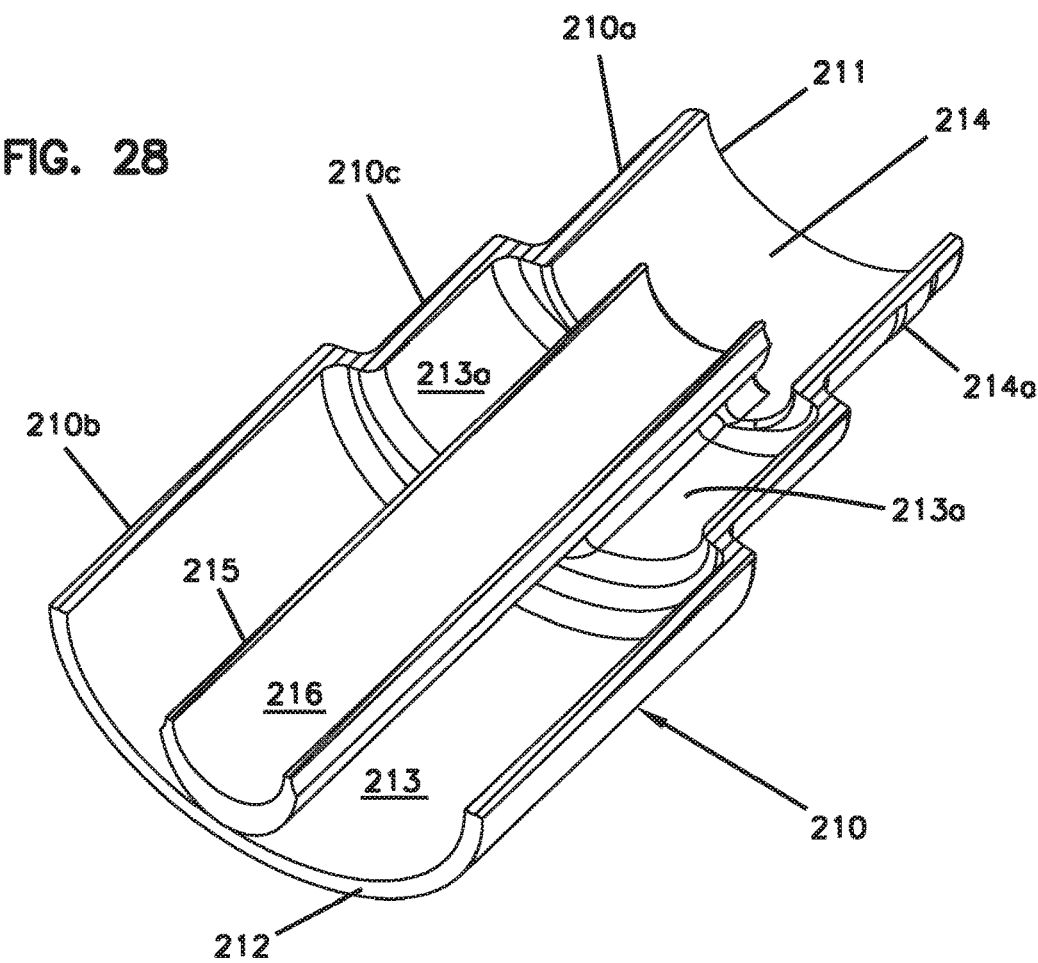
FIG. 28 is a perspective view of FIG. 26 rotated 180°.
Figure 29:
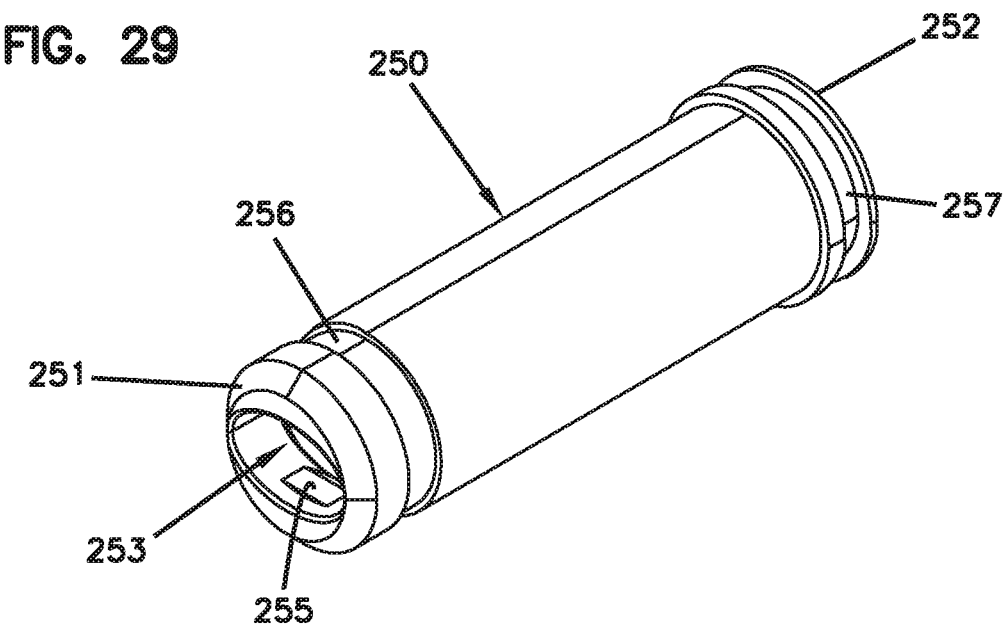
FIGS. 29 and 30 are first and second end perspective views, respectively, of an example plug housing of FIG. 20.
Figure 30:
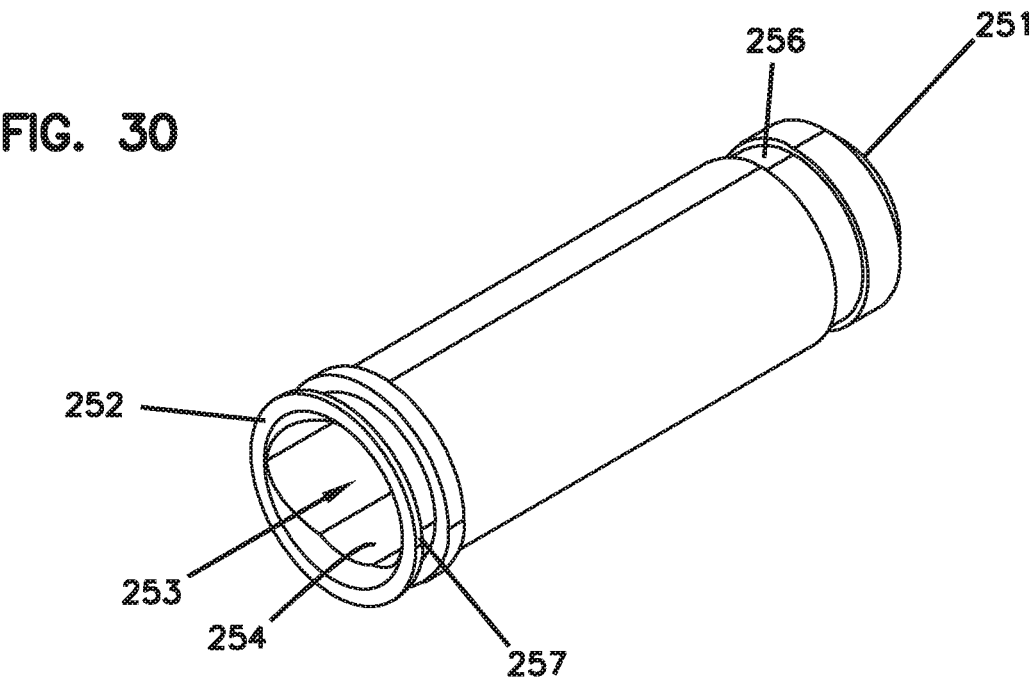
Figure 31:
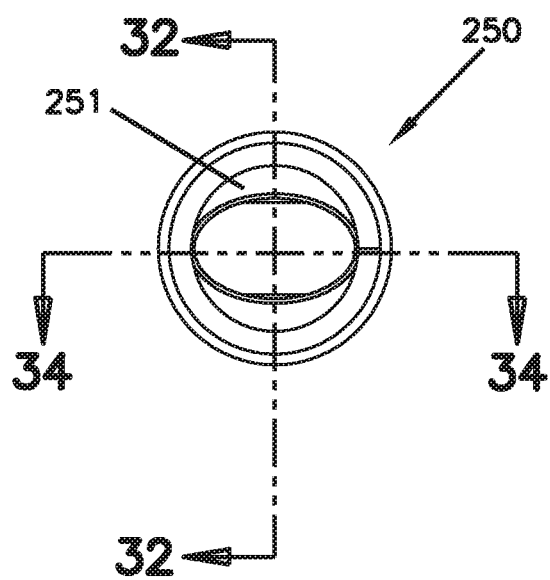
FIG. 31 is an end view of the plug housing of FIG. 20.
Figure 32:
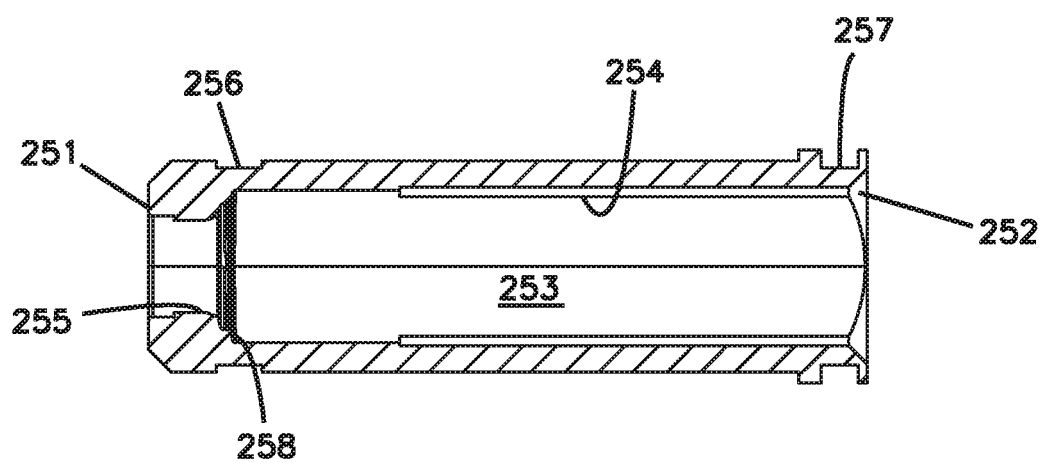
FIGS. 32 and 33 are longitudinal cross-sectional views of the plug housing of FIG. 20 taken along the 32-32 line of FIG. 31.
Figure 33:
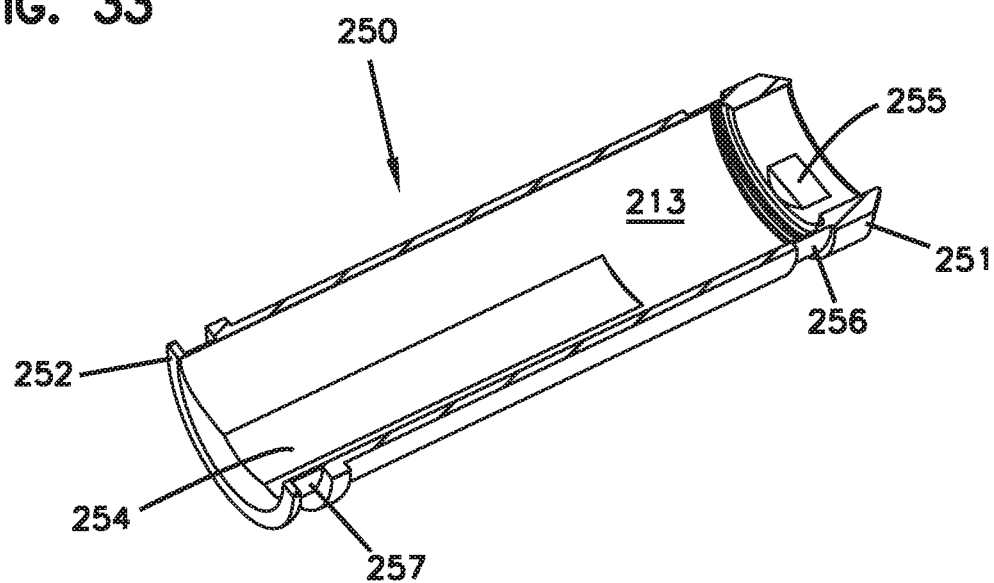
Figure 34:
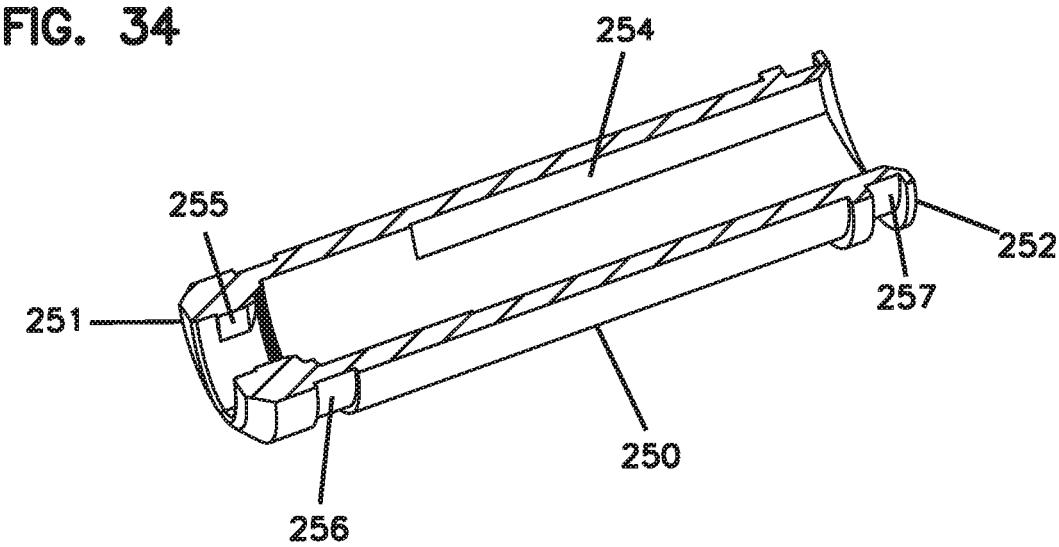
FIG. 34 is a longitudinal cross-sectional view of the plug housing of FIG. 20 taken along the 34-34 line of FIG. 31.
Figure 35:
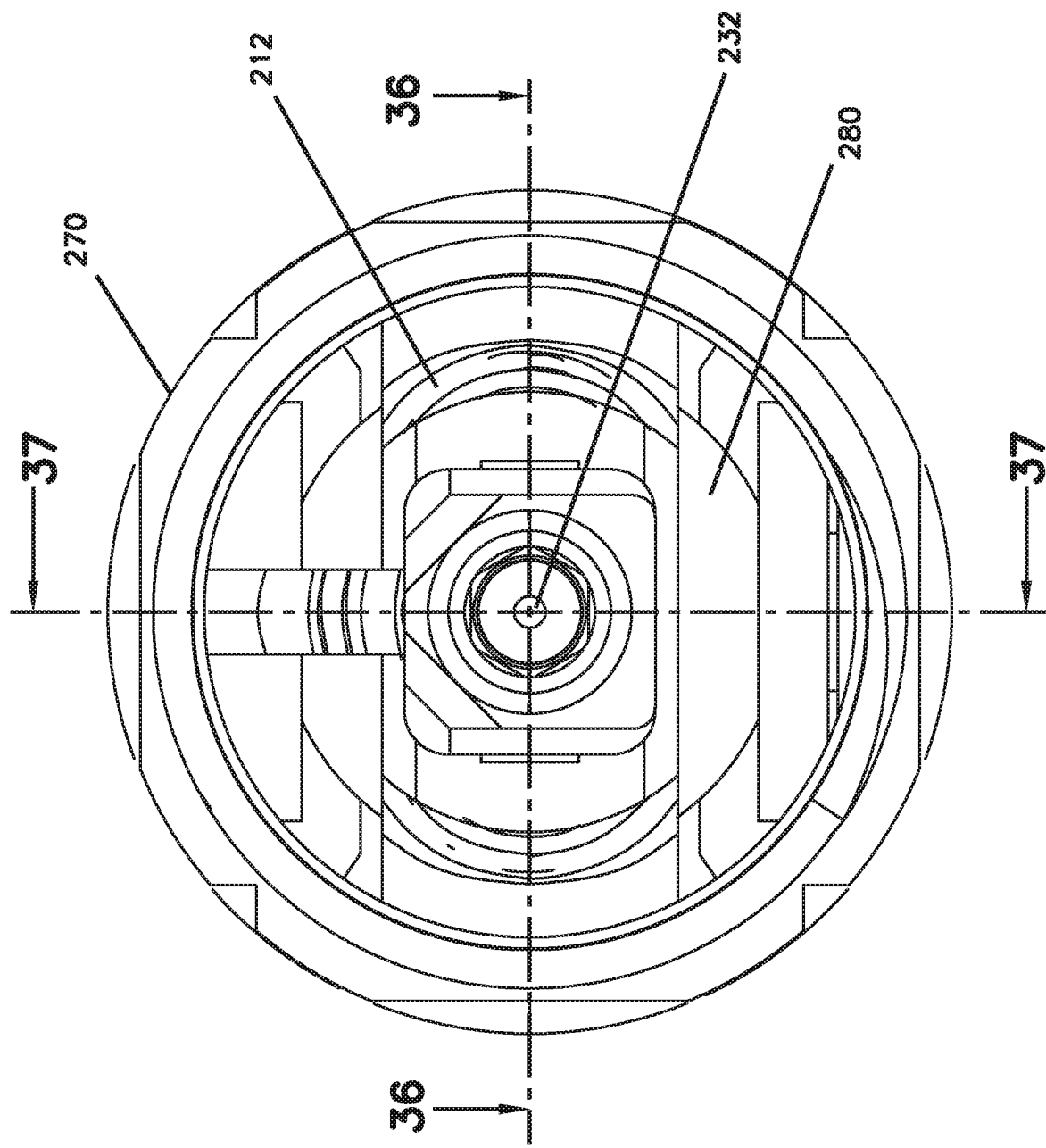
FIG. 35 is an end view of a fully assembled connector assembly of FIG. 20.

In certain implementations, an internal passage member 115, 215 is disposed within the first through-passage 113, 213 of the body so that a portion of the first through-passage 113, 213 bypasses the internal passage member 115, 215 (see FIGS. 5 and 24). The internal passage member 115, 215 extends between a respective first end and a respective second end.

In some implementations, the respective first and second ends of the internal passage member 115 are inwardly offset from the first and second open ends 111, 112 of the anchor member 110. In other implementations, the first end of the internal passage member 215 is inwardly offset from the first open end 211 of the anchor member 210. In certain examples, the second end of the internal passage member 215 may extend beyond the second open end 212 of the anchor member 210. In other examples, the second end of the internal passage 215 may terminate concurrent with the second open end 212 or may be inwardly recessed relative to the second open end 212.

In some examples, the respective first end of the internal passage member 115, 215 is disposed between the fill stop line and the first open end 111, 211 of the anchor member 110, 210. In other examples, the respective first end of the internal passage member 115, 215 is disposed between the fill stop line and the second open end 112, 212 of the anchor member 110, 210.

The internal passage member 115, 215 defines a second through-passage 116, 216 extending between openings at the first and second ends of the internal passage member 115, 215 (see FIGS. 5 and 24). In certain implementations, the internal passage member 115, 215 extends fully across the first through-passage 113, 213 in a first radial direction while not extending fully across the first through-passage 113, 213 in a second radial direction. For example, in certain examples, the internal passage member 115, 215 has a different transverse cross-sectional shape than the anchor member 110, 210. Accordingly, the first through-passage 113, 213 includes one or more bypass channels 113a, 213a that extends alongside the second through-passage 116, 216 (see FIGS. 14 and 28). In certain examples, the adhesive dispenser is routed through one of the bypass channels 113a, 213a.

In certain examples, the internal passage member 115, 215 includes a base 115a, 215a and a sleeve 115b, 215b. In the example shown, the base 115a, 215a and sleeve 115b, 215b are monolithic (e.g., integrally molded) parts. In other examples, however, the base 115a, 215a and sleeve 115b, 215b could be separate parts. The base 115a, 215a connects to an interior of the anchor member body. In an example, the base 115a, 215a is monolithically formed (e.g., integrally molded) with the body of the anchor member 110, 210. In the example shown, the base 115a, 215a has an oval shape that extends fully across the first through-passage 113, 213 in a first cross-dimension. The sleeve 115b, 215b extends outwardly from the base 115a, 215a towards the second open end 112, 212 of the anchor member 110, 210. The end of the base 115a, 215a from which the sleeve 115b, 215b extends defines a shoulder 117, 217 facing the second open end 112, 212 of the anchor member 110, 210 (see FIGS. 8 and 25).

In some examples, the base 115a, 215a and sleeve 115b, 215b cooperate to define the second through-passage 116, 216. In other examples, however, the sleeve 115b, 215b defines the second through-passage 116, 216 and the base 115a, 215a connects the sleeve 115b, 215b to the anchor member body.

Figure 23:
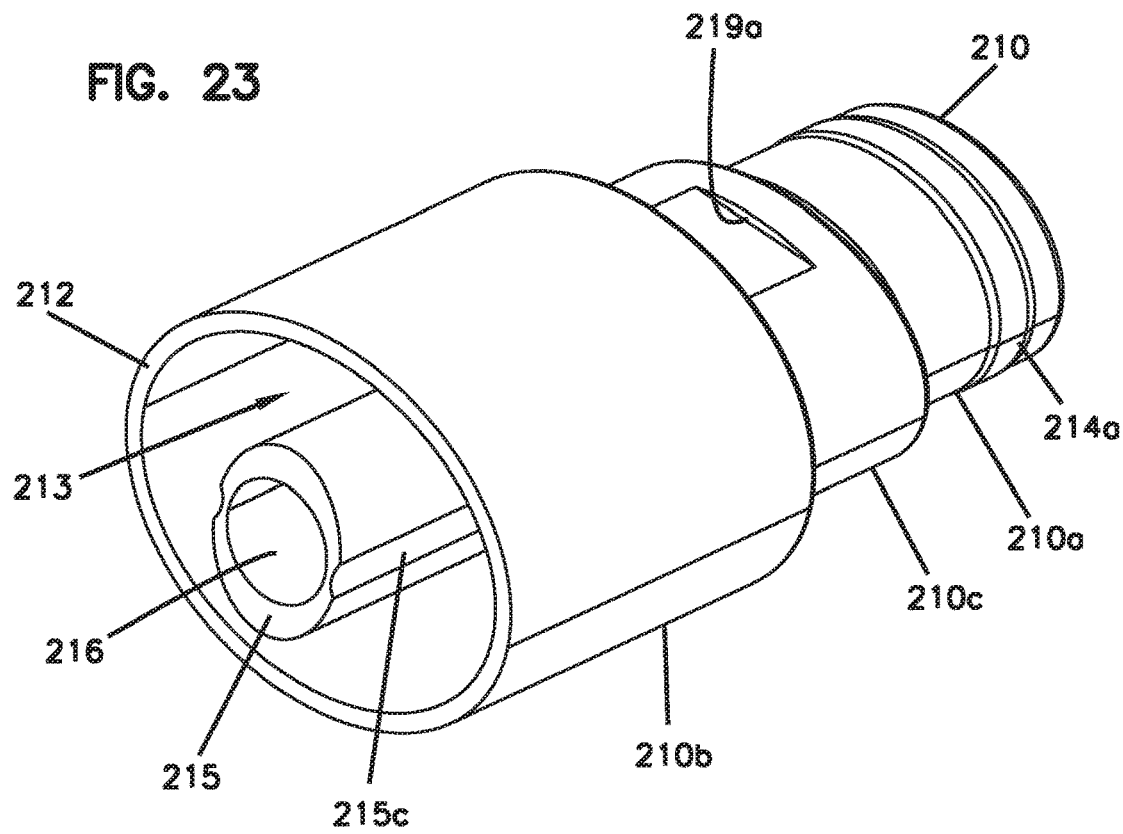
FIG. 23 is a second end perspective view of the second anchor member of FIG. 20.

In certain examples, the sleeve 115b, 215b and/or base 115a, 215a defines channels 215c along an exterior of the internal passage member 115, 215 (see FIG. 23). The channels 215c are accessible from the first through-passage 113, 213 as will be described in more detail herein. In certain examples, the sleeve 115b, 215b and/or base 115a, 215a also may define internal channels accessible from the second through-passage 116, 216.

Referring to FIGS. 3, 4, 22, and 23, the first open end 111, 211 of the anchor member 110, 210 may have a different transverse cross-sectional size and/or shape than the second open end 112, 212 of the anchor member 110, 210. In certain implementations, the first open end 111, 211 of the anchor member 110, 210 is sized and shaped to receive any of a selection of cables 101 of different shapes and sizes in the connection system.

For example, the first open end 111, 211 may have an oblong transverse cross-dimensional shape and the second open end 112, 212 may have a circular transverse cross-dimensional shape. In other examples, the first and second open ends 111, 112, 211, 212 may have the same transverse cross-dimensional shape. In certain examples, the first and second open ends 111, 112, 211, 212 may have the same transverse cross-dimensional size.

In certain examples, an exterior surface of the first open end 111, 211 of the anchor member 110, 210 may be textured (e.g., have threads, ribs, bumps, etc.) to enhance the connection between the anchor member 110, 210 and the conformable sleeve 120, 220.

In certain implementations, the anchor member 110, 210 includes attachment structure to aid in securing the anchor member 110, 210 to the plug body 150, 250.

In some implementations, the second open end 112 of the anchor member 110 is sized and shaped to couple to the one or more plug bodies 150 of the connection system. In certain examples, the second open end 112 of the anchor member 110 may include fastening structures (e.g., threads, latches, etc.) or gripping structures (e.g., have ribs, bumps, etc.) to enhance the connection between the anchor member 110 and the plug body 150. In the example shown, ribs or threads 119 are disposed at an internal surface of the second open end 112.

In certain implementations, the anchor member 110 defines an external abutment shoulder 118a that engages a corresponding shoulder of the plug body 150 to axially retain the anchor member 110 in at least a first axial direction relative to the plug body 150. In the example shown, the external abutment shoulder 118a faces the second open end 112 of the anchor member 110. An external ramp 118a faces the first open end 111. In certain examples, the anchor member 110 includes an enlarged intermediate section that defines the shoulder 118a and ramp 118b at the transitions between the intermediate section and the second and first open ends 112, 111, respectively.

In other implementations, the anchor member 210 is sized and shaped to fit within an interior of the plug body 250. For example, the anchor member 210 may define a radial shoulder 218 facing towards the first open end 211. The radial shoulder 218 is configured to abut an oppositely facing shoulder of the plug body 250 as will be described in more detail herein.

In the example shown, the anchor member 210 has a first end portion 210a, a second end portion 210b, and an intermediate portion 210c. The first end portion 210a includes the first open end 211 and forms the receiving region 214. The second end portion 210b includes the second open end 212. The intermediate portion 210c extends between the first and second end portions 210a, 210b. The radial shoulder 218 transitions between the second end portion 210b and the intermediate portion 210c.

In certain examples, the anchor member 210 includes a securement mechanism to engage the plug body 250. For example, the anchor member 210 may define an external groove 219 forming a second radial shoulder 219a facing the first radial shoulder 218. In other examples, the anchor member 210 may define an external protrusion (e.g., a latch).

FIGS. 29-34 illustrate an example plug body 250 suitable for receiving the anchor member 210. The plug body 250 extends along a length from a first open end 251 to a second open end 252. The plug body 250 defines a hollow interior 253 extending between the first and second open ends 251, 252.

The second open end 252 is sized to receive the anchor member 210. The first open end 251 is generally smaller or has at least one transverse cross-dimension that is smaller than the second open end 252. The first open end 251 is sized sufficiently small to inhibit passage of the anchor member 210 through the first open end 251. In certain examples, the first open end 251 may have a different shape than the second open end 252. For example, the first open end 251 may be oblong while the second open end 252 is circular.

In certain implementations, the plug body 250 is substantially hollow. For example, the hollow interior 253 may take-up a majority of the volume of the plug body 250. In certain examples, an inner surface of the plug body 250 defines grooves 254 extending inwardly from the second open end 252. For example, the grooves 254 may accommodate an oblong shape of the anchor member 210.

In certain implementations, the plug body 250 has a radially inward shoulder 258 facing the second open end 252. The shoulder 258 is sized to abut the first radial shoulder 218 of the anchor member 210 when the anchor member 210 is disposed within the plug body interior. The engagement of the shoulders 218, 258 inhibits axial movement of the anchor member 210 through the first open end 251 of the plug body 250.

In certain implementations, the plug body 250 includes part of a securement mechanism to hold the anchor member 210 at an axially fixed position relative to the plug body 250. In certain examples, one of the plug body 250 and the anchor member 210 includes protrusions and the other of the plug body 250 and the anchor member 210 defines grooves into which the protrusions extend. For example, the plug body 250 includes one or more teeth 255 sized and shaped to protrude radially into the external groove 219 defined in the anchor member 210. Engagement between the teeth 255 of the plug body 250 and the second radial shoulder 219a of the anchor member 210 inhibits axial movement of the anchor member 210 relative to the plug body 250 towards the second open end 252.

In certain implementations, a sealing member can be disposed between the anchor member 210 and the plug body 250. For example, a radial seal S (e.g., an O-ring) can be disposed on the anchor member 210 adjacent the first radial shoulder 218. The radial seal S can be compressed between the radial shoulder 218 and the shoulder 258 to seal between the anchor member 210 and the plug body 250.

In certain implementations, the plug body 250 is configured to fit with the strain-relief boot 260 to axially retain the strain-relief boot 260 relative to the plug body 250. For example, the plug body 250 may define a groove 256 to receive one or more inner protrusions of the strain-relief boot 260. For example, a radially inwardly-extending rib 262 of the strain-relief boot 260 may snap into the groove 256. In certain examples, the first end 251 of the plug body 250 may be tapered to enable the strain-relief boot 260 to cam over the first end before snapping into the groove 256.

In certain implementations, the plug body 250 is configured to carry the plug connector seal 285. For example, the plug body 250 may define a groove 257 at the second open end 252 at which the seal 285 is disposed. In other examples, the exterior of the second open end 252 can define a radially outwardly extending flange or other sealing surface for a seal disposed at a receptacle for receiving the plug connector.

Figure 16:
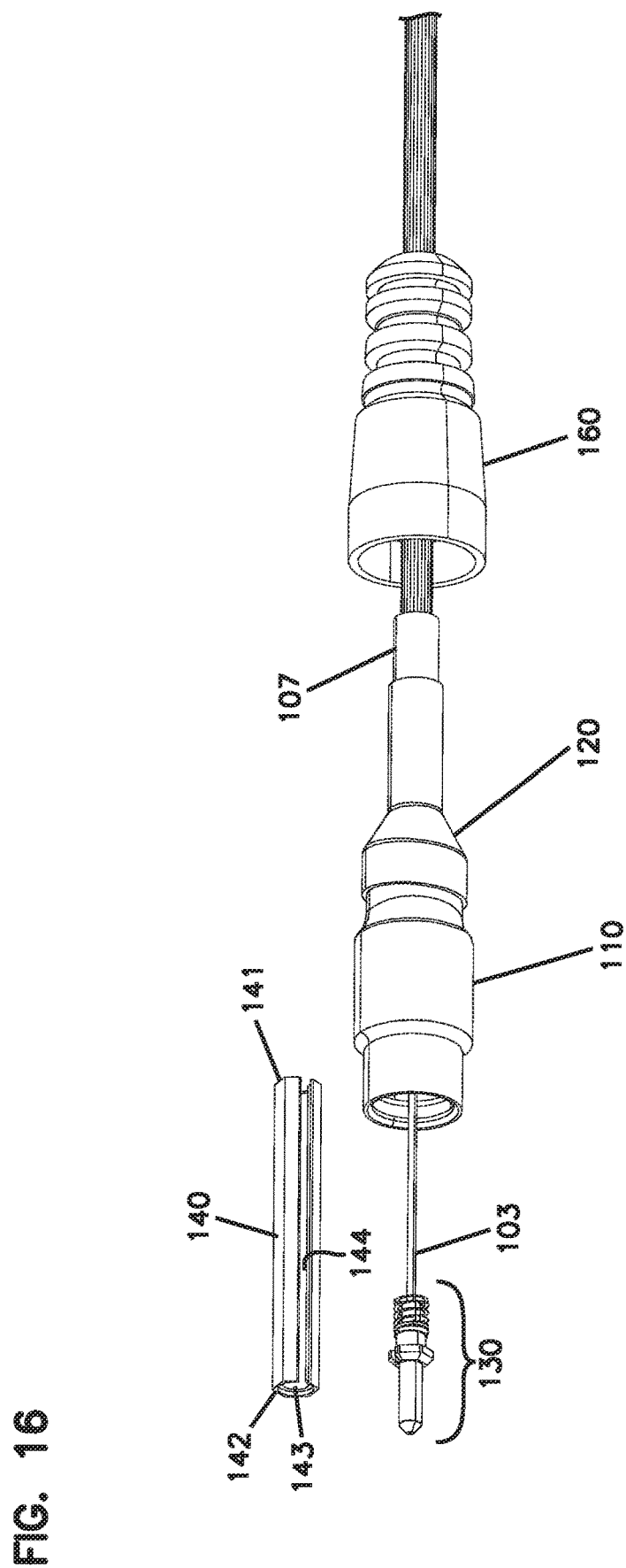
FIG. 16 illustrates a spring push exploded away from the prepared cable of FIG. 15.
Figure 17:
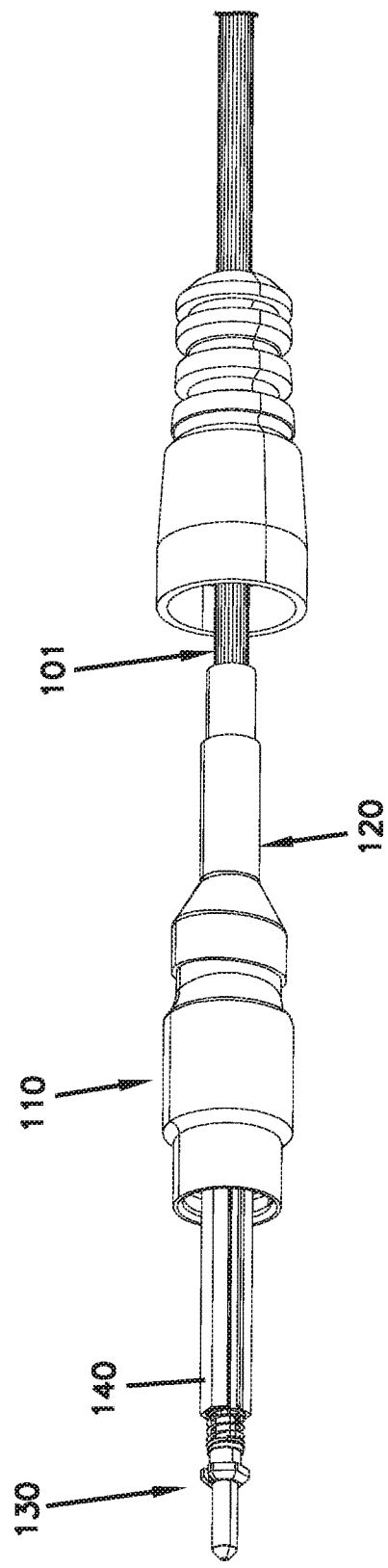
FIG. 17 illustrates the spring push of FIG. 16 mounted on the carrier of FIG. 16.
Figure 18:
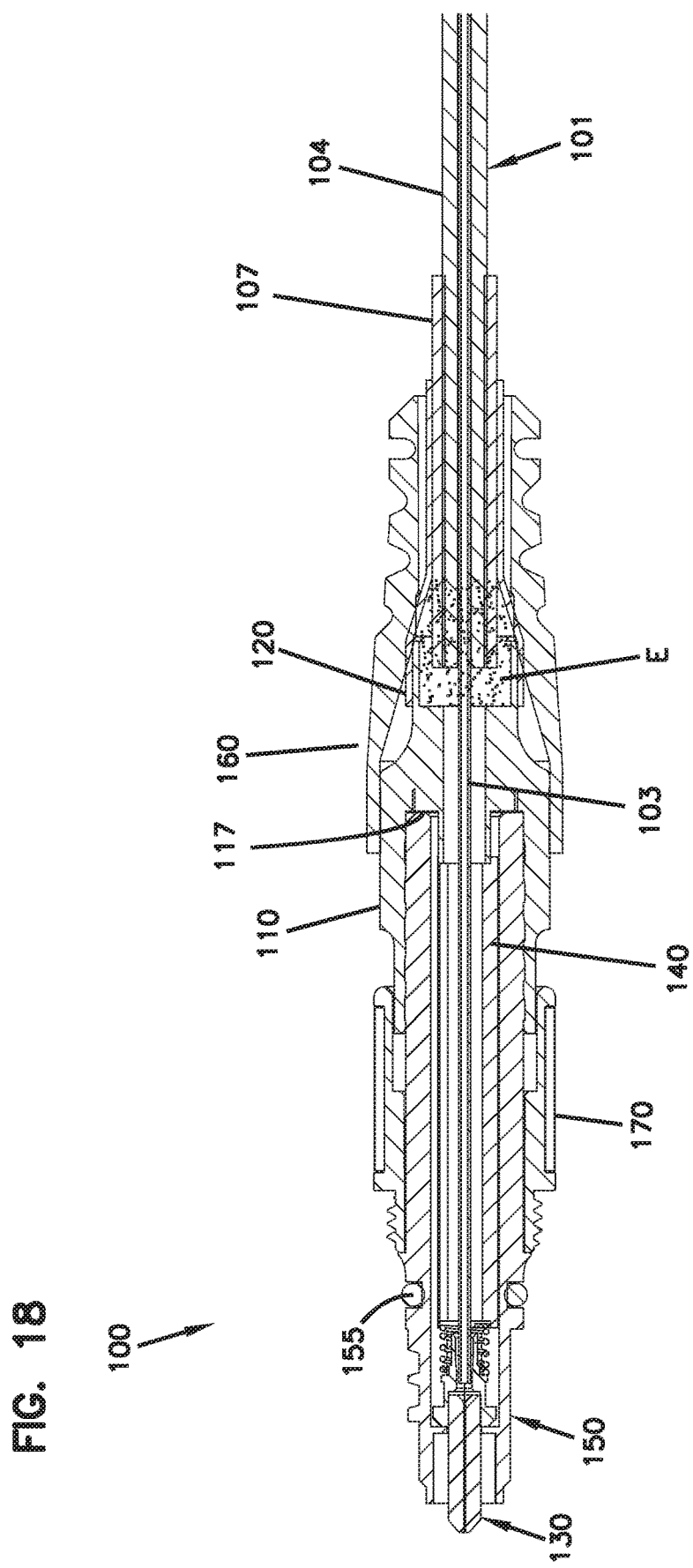
FIG. 18 is a longitudinal cross-sectional view of a fully assembled connector assembly using the anchor member of FIGS. 3-9.
Figure 19:
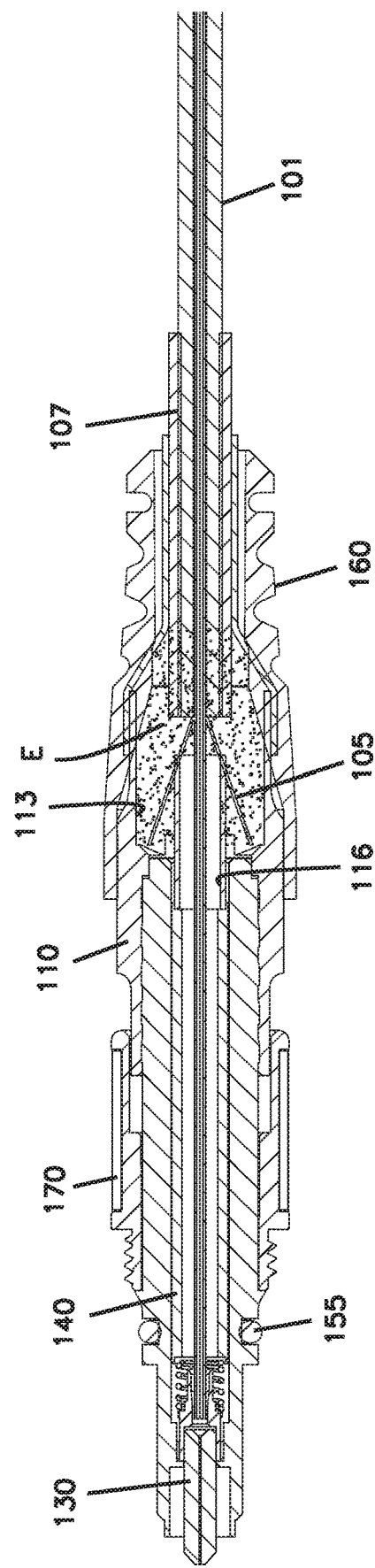
FIG. 19 shows the fully assembled connector assembly of FIG. 18 rotated about 90° about a longitudinal axis of the connector assembly.
Figure 36:
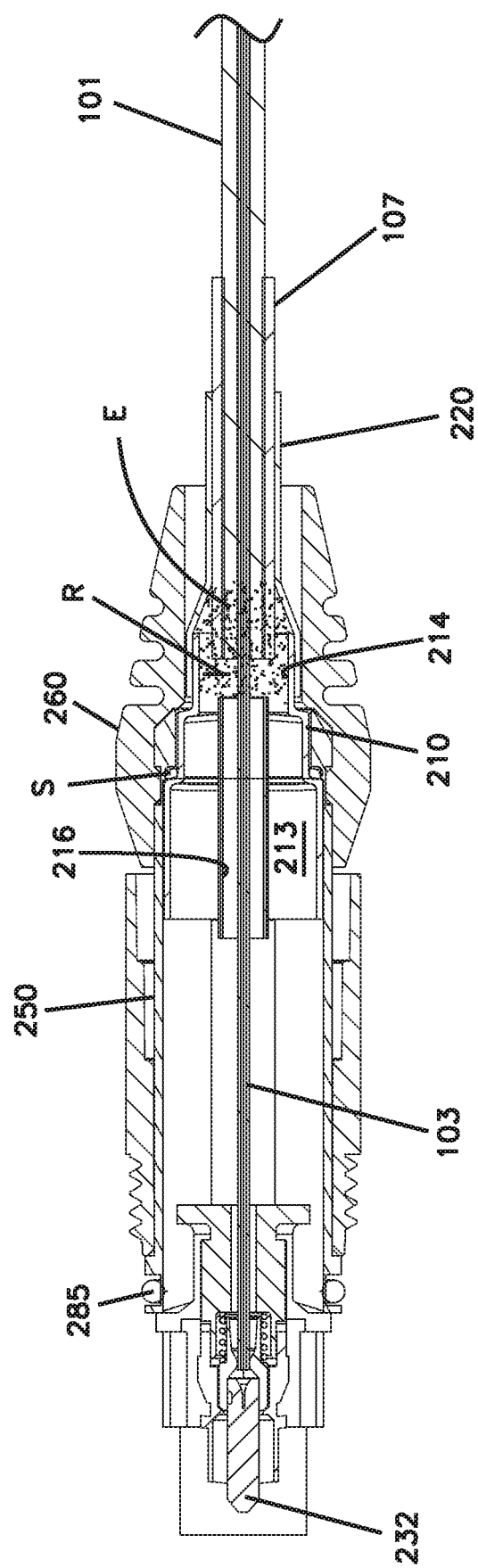
FIG. 36 is a longitudinal cross-sectional view of the fully assembled connector assembly of FIG. 20 taken along the 36-36 line of FIG. 35.
Figure 37:
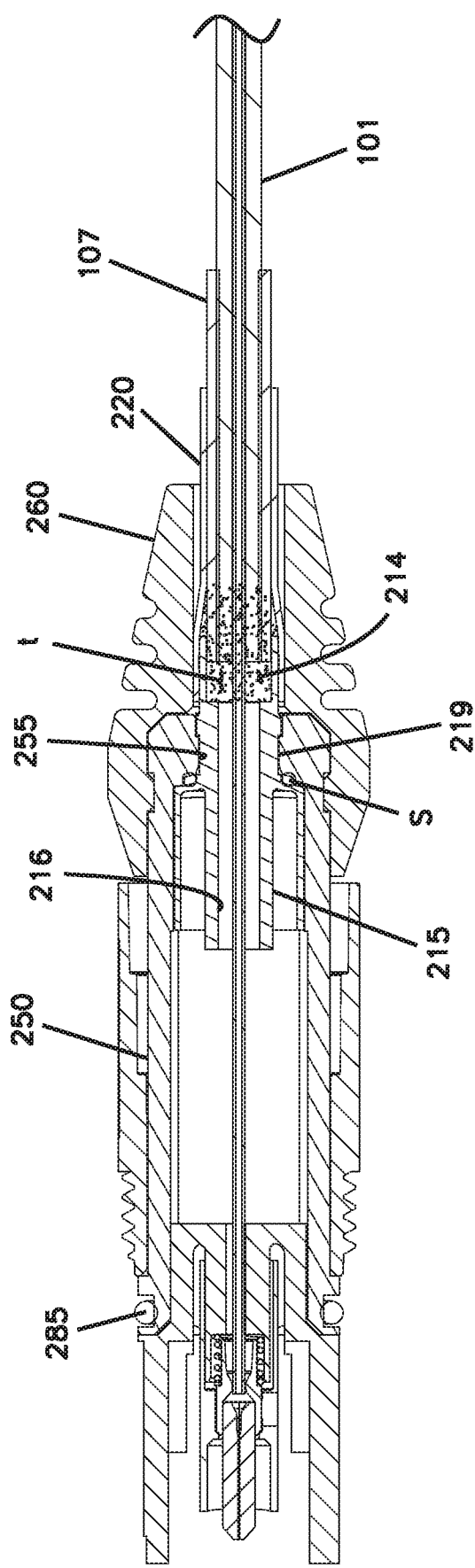
FIG. 37 is a longitudinal cross-sectional view of the fully assembled connector assembly of FIG. 20 taken along the 37-37 line of FIG. 35.

FIGS. 10-19 illustrate the steps of connectorizing a cable 101 using the anchor member 110. While the steps are illustrated using the anchor member 110, it will be understood that these same steps are performed with the anchor member 210 except where indicated. FIGS. 18 and 19 illustrate a cable 101 connectorized using the anchor member 110 and plug body 150. FIGS. 36 and 37 illustrate a cable 101 connectorized using the anchor member 210 and plug body 250.

While the connectorization of a single cable 101 is shown, it will be understood that multiple cables 101 could be secured to the anchor member 110 using the same techniques described below. For convenience and ease in understanding, however, the steps of FIGS. 10-19 are illustrated using a single cable 101.

Figure 10:
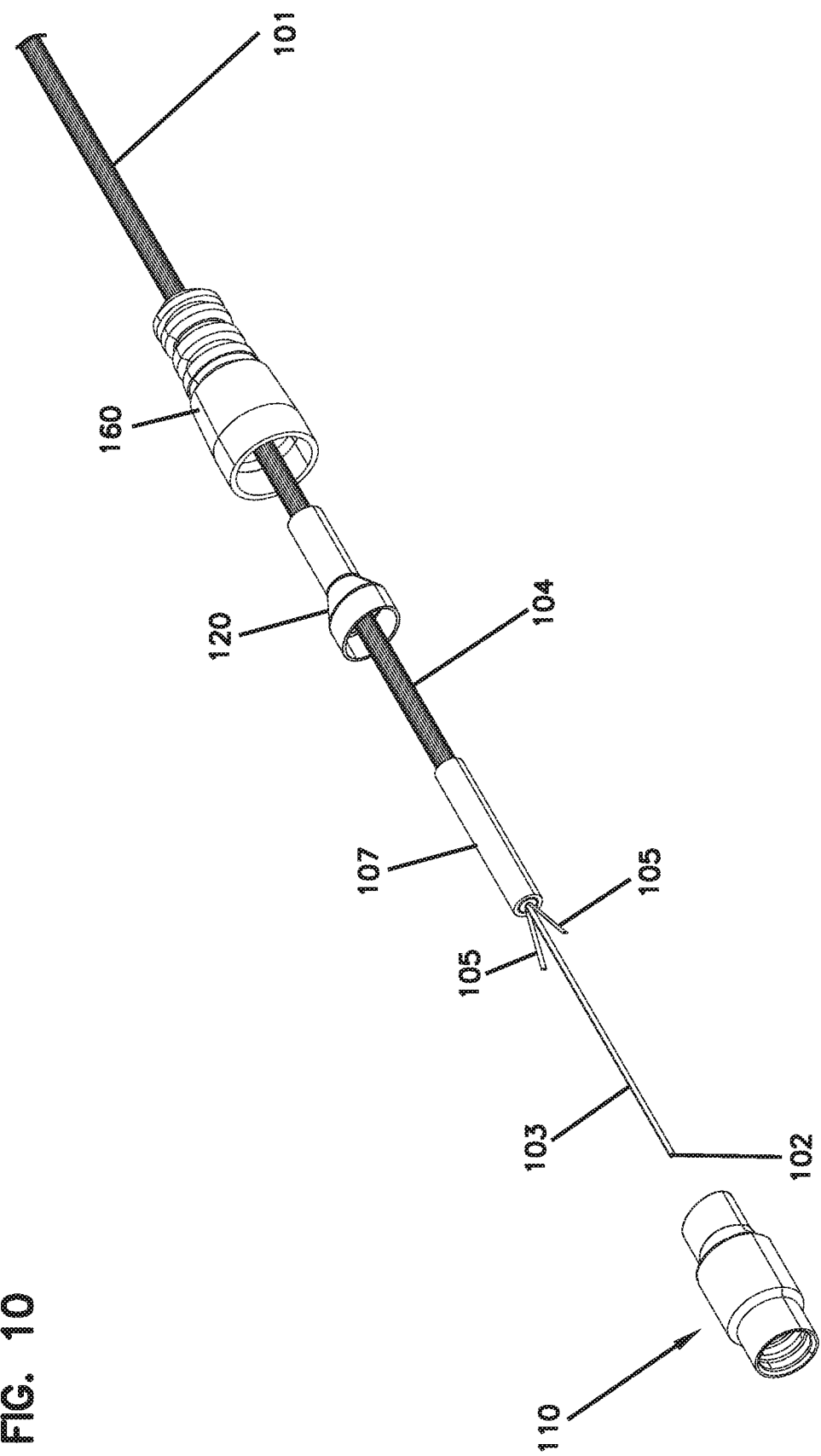
FIG. 10 illustrates the anchor member of FIG. 1 exploded forward of a prepared cable.

As shown in FIG. 10, the cable 101 is prepared by removing a portion of the jacket 104 from the second end 102 to expose a length of the one or more carriers 103 of the cable 101. Strength members 105 of the cable also are exposed. In certain examples, the strength members 105 are trimmed shorter than the one or more carriers 103. In certain implementations, a conformable sleeve 107 is mounted over the terminated end of the jacket 104 to smooth out an external profile of the cable 101.

Rear components of the connector (i.e., components disposed rearward of the anchor member 110) may be threaded over the cable 101 prior to or during preparation of the cable 101. In the example shown, the strain relief boot 160 and first conformable sleeve 120 are threaded over the cable 101.

Figure 11:
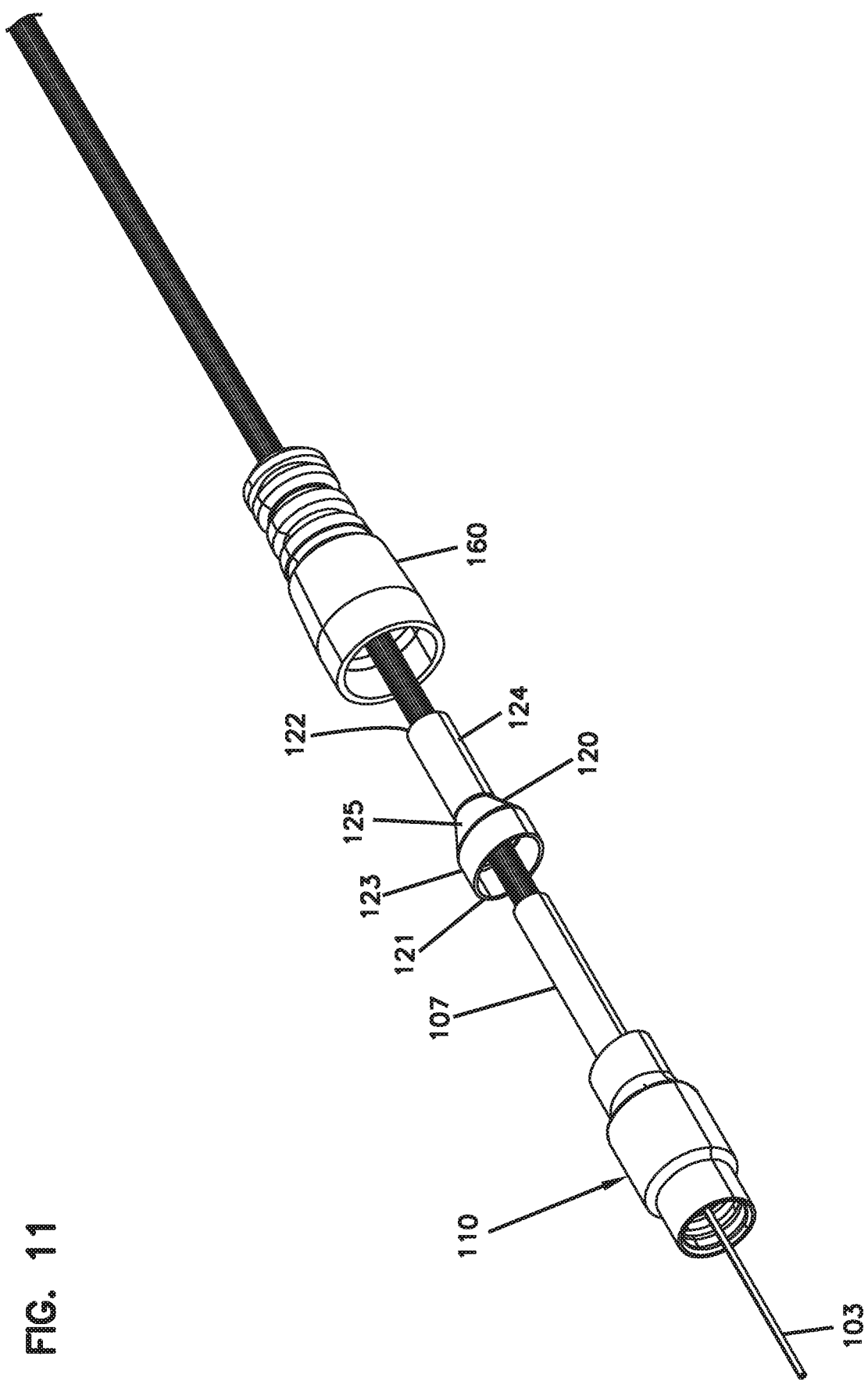
FIG. 11 illustrates the prepared cable of FIG. 10 threaded through the anchor member of FIG. 10 so that the carrier extends forward of the anchor member and the terminated end of the jacket enters the receiving region of the anchor member.

As shown in FIG. 11, the anchor member 110, 210 is threaded over the exposed portion of the one or more carriers 103 so that the end 102 of the one or more carrier 103 extend outwardly (i.e., forwardly) from the second open end 112 of the anchor member 110, 210. The anchor member 110, 210 is positioned so that the terminated end of the jacket 104 is disposed within the anchor member 110, e.g., at the receiving region 114, 214 of the anchor member 110, 210. In certain examples, the second conformable sleeve 107 extends partially into the receiving region 114, 214 of the anchor member 110, 210.

The one or more cables 101 being terminated fit within the receiving region 114, 214 of the anchor member 110, 210. In some examples, the one or more cables 101 are positioned to not touch the anchor member 110, 210. Accordingly, a radial gap R (FIGS. 13 and 36) extends between the one or more cables 101 and an internal surface of the receiving region 114, 214. In other examples, one or more cables 101 may contact part of the receiving region 114, 214, but be spaced along a gap R from other portions of the receiving region 114, 214. In certain examples, the largest of the cables of the connection system may contact the internal surfaces of the receiving region 114, 214.

In some examples, the radial gap R has a constant radius. In other examples, the radius of the radial gap R varies in size (e.g., when the cross-dimensional shape of the cable 101 differs from the cross-dimensional shape of the receiving region). For example, a round cable 101 can be received in an oblong receiving region 114, 214. Alternatively, a flat cable 101 can be received in a round receiving region 114, 214. In other examples, a group of cables 101 can form an irregular cross-dimensional shape within the receiving region 114, 214. In an example, the one or more cables 101 may be centered along a longitudinal axis of the anchor member 110, 210.

In some implementations, the jacket 104 extends through the receiving region 114, 214 and abuts the internal passage member 115, 215. In other implementations, the jacket 104 extends into the second through-passage 116, 216 of the internal passage member 115, 215. In still other implementations, the jacket 104 terminates before reaching the internal passage member 115, 215. In some implementations, the strength members 105 of the cable 101 extend through the bypass channels 113a, 213a of the first through-passage 113, 213. For example, rigid rod-like strength members 105 may extend along external channels defined by the internal passage member 115, 215. In other implementations, the strength members 105 may be routed into the second through-passage 116, 216.

The one or more carriers 103 are routed through the second through-passage 116, 216. Accordingly, each carrier 103 extends from the first open end 111, 211, through the first through-passage 113, 213 until reaching the first end of the internal passage member 115, 215, through the second through-passage 116, 216 until reaching the second end of the internal passage member 115, 215, and through the first through-passage 113, 213 until reaching the second open end 112, 212. In certain implementations, e.g., when a separate plug body 150, 250 attaches to the anchor member 110, 210, each carrier 103 continues to extend beyond the second open end 112, 212 of the anchor member 110, 210.

Typically, the carrier(s) 103 is sufficiently flexible that the end 102 of the carrier(s) 103 is laterally moveable relative to the anchor member 110, 210. In certain examples, the carrier(s) 103 is sufficiently flexible that the end 102 of the carrier(s) 103 is axially moveable relative to the anchor member 110, 210. In certain examples, the carrier(s) 103 is sufficiently flexible that the end 102 of the carrier(s) 103 can be oriented at an angle (e.g., bent) relative to the anchor member 110, 210. In certain examples, the carrier(s) 103 is sufficiently flexible that the end 102 of the carrier(s) 103 can be at least partially rotated relative to the anchor member 110, 210.

Figure 12:
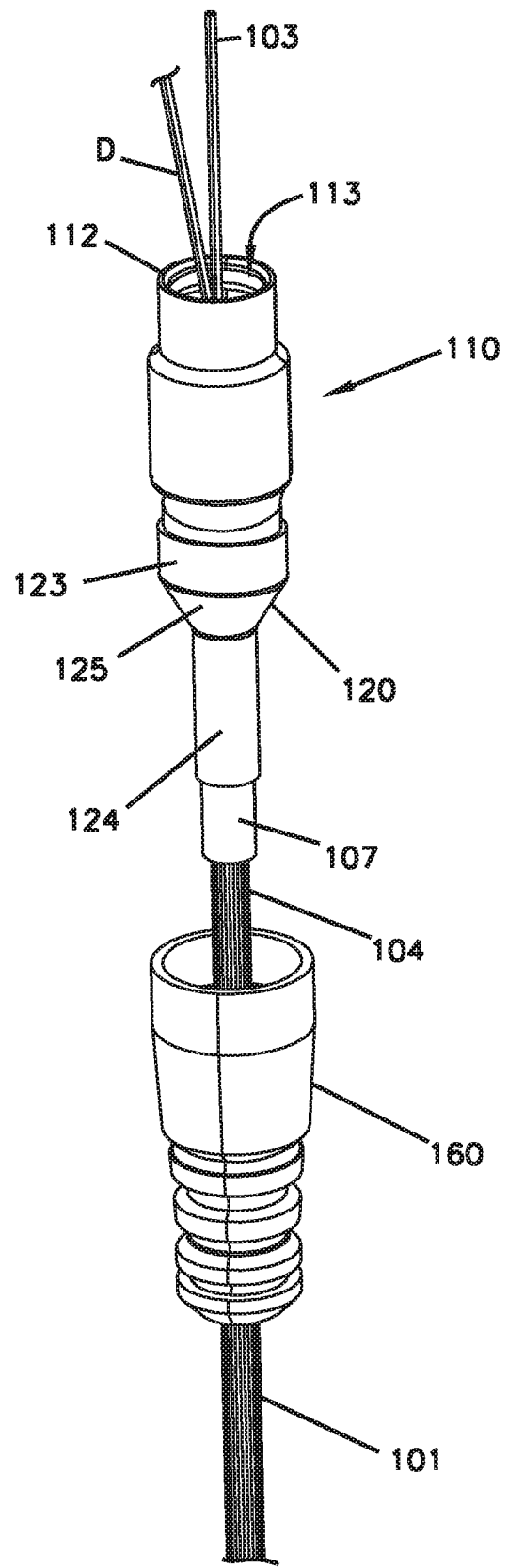
FIG. 12 illustrates the prepared cable and anchor member oriented vertically.
Figure 13:
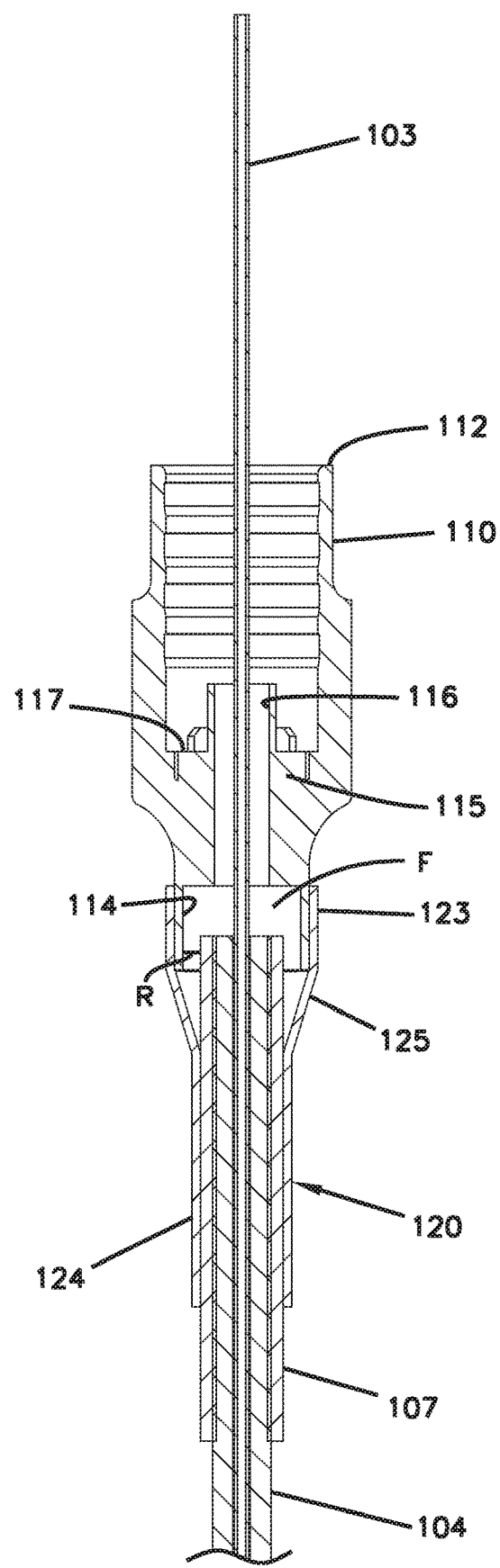
FIG. 13 is a longitudinal cross-sectional view of the prepared cable and anchor member of FIG. 12.
Figure 14:
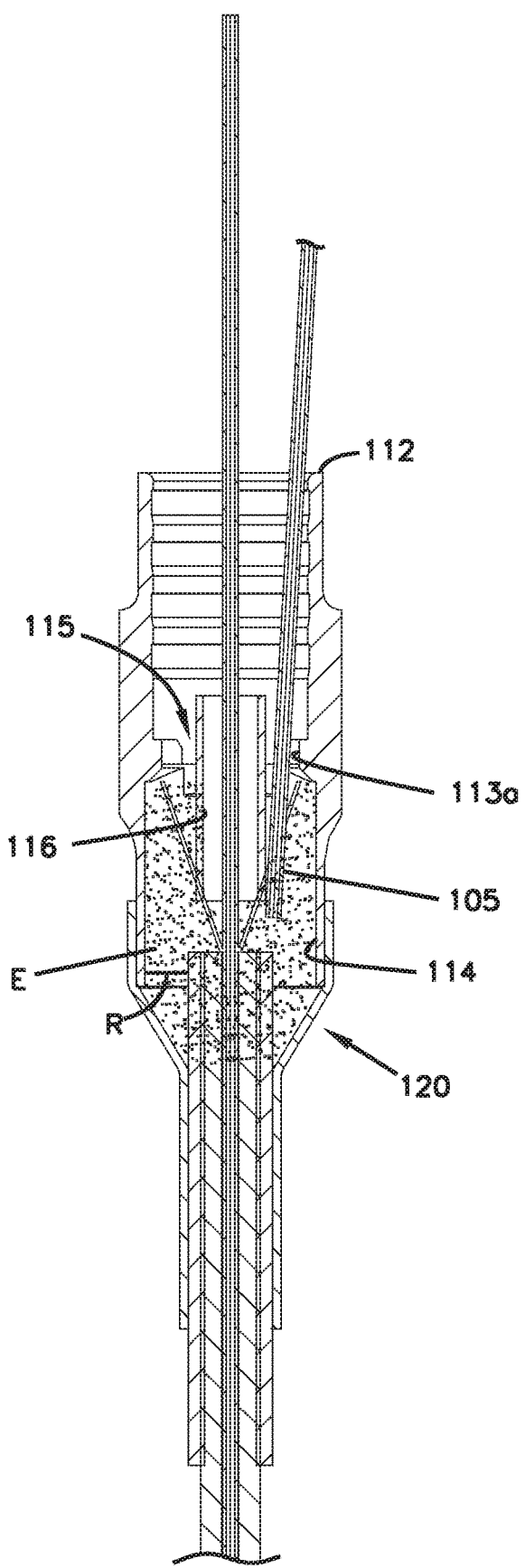
FIG. 14 shows the prepared cable and anchor member of FIG. 13 rotated about 90° about a longitudinal axis of the anchor member.
Figure 15:
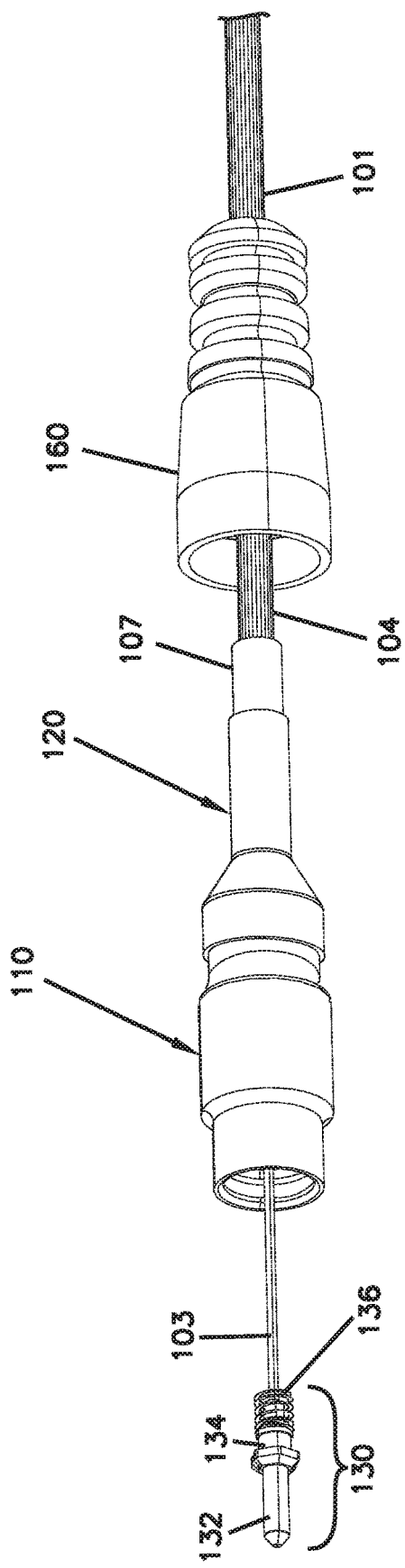
FIG. 15 illustrates a ferrule assembly being mounted to an end of the carrier.

As shown in FIGS. 12-14, the first conformable sleeve 120, 220 is mounted to the anchor member 110, 210 at the first open end 111, 211. The first conformable sleeve 120, 220 creates at least a temporary seal between the anchor member 110, 210 and the cable 101. For example, the first conformable sleeve 120, 220 has a first section 123, 223 that attaches to the first open end 111, 211 of the anchor member 110, 210 and a second section 124, 224 that attaches to the cable 101 (e.g., to the jacket 104 or to the second conformable sleeve 107). The first section 123, 223 is larger than the second section 124, 224.

A transitional section 125 extends between the first and second sections 123, 124, 223, 224. The transitional section 125 spans the radial gap R between the one or more cables 101 and the receiving region 114, 214 to close the open first end 111, 211. In some example, the transitional section 125 forms a step. In other examples, the transitional section 125 tapers between the first section 123, 223 and the second section 124, 224.

In some implementations, the first conformable sleeve 120, 220 is a thermally recoverable sleeve that shrinks onto the first open end 111, 2111 and onto the cable 101 when heat is applied. In other implementations, the first conformable sleeve 120, 220 is an elastic sleeve that shrinks onto the first open end 111, 211 and onto the cable 101 when a stretching member is removed. In other implementations, the first conformable sleeve 120, 220 may be a combination of elastic and thermally recoverable. In certain implementations, adhesive may be used to further secure the first conformable sleeve 120, 220 to the anchor member 110, 210 or to the cable 101.

As shown in FIG. 13, the first conformable sleeve 120, 220 cooperates with the receiving region 114, 214 of the anchor member 110, 210 to define a filling volume F. In some implementations, the filling volume F is entirely contained within the receiving region 114, 214 and the first conformable sleeve 120, 220 closes the first open end 111, 211 of the anchor member 110, 210 to close the receiving region 114, 214. In other implementations, the filling volume F extends rearwardly beyond the first open end 111, 211 of the anchor member 110, 210 to the end of the transitional section 125 (wherein the first conformable sleeve 120, 220 seals to the cable 101).

In certain implementations, at least part of the cable jacket 104 extends into the filling volume F. In certain implementations, the strength members 105 also extend into the filling volume F. The carrier 103 also extends through the filling volume F. In some examples, the carrier 103 is exposed within the filling volume F. In other examples, the carrier 103 surrounded by the jacket 104 or a buffer throughout the filling volume F.

The cable 101 and anchor member 110, 210 are oriented vertically so that the first and second open ends 111, 112, 211, 212 face downwardly and upwardly, respectively. A dispenser D (e.g., a syringe, a straw, etc.) is inserted into the anchor member 110, 210 through the second end 112, 212. Adhesive is dispensed (e.g., injected) into the filling volume F via the dispenser D. For example, adhesive may be dispensed until the adhesive reaches the fill stop line. In some examples, the adhesive is dispensed until the adhesive reaches the internal passage member 115, 215. In other examples, the adhesive does not reach the internal passage member 115, 215. The adhesive E fills the radial gap R between the one or more cables 101 and the internal surface of the receiving region 114, 214.

The conformable sleeve 120, 220 maintains the adhesive E in the filling volume F. The seal between the second section 124, 224 of the conformable sleeve 120, 220 and the one or more cables 101 inhibits leaking of the adhesive E beyond the filling volume F.

The adhesive E surrounds and bonds to at least a portion of the cable jacket 104 (see FIG. 14 and FIG. 36). In certain implementations, the adhesive E surrounds and bonds to the strength members 105. For example, the adhesive E may surround the strength members within the first through-passage 113, 213. In some implementations, the adhesive E surrounds a portion of the one or more carriers 103. In some such examples, the adhesive E surrounds the portion of the carrier(s) 103 extending from the cable jacket 104 to the internal passage member 115, 215. In other such examples, the adhesive E is applied to the second through-passage 116, 216 to surround the carrier(s) 103. In still other examples, a buffer tube or the jacket 104 isolates the carrier(s) 103 from the adhesive E through the first through-passage 113, 213 to the internal passage member 115, 215 and the adhesive E is not disposed in the second through-passage 116, 216.

In certain implementations, the adhesive E cures at ambient temperatures (i.e., room temperature). In certain implementations, the adhesive E cures within five minutes. In certain examples, the adhesive E cures within one minute. In certain implementations, the adhesive E is self-leveling. In certain implementations, the adhesive E has a sufficient viscosity to enable the adhesive E to self-level within the filling volume F while the anchor member 110, 210 is oriented vertically.

In some implementations, the adhesive is a urethane adhesive. In certain examples, the urethane adhesive includes a resin and a hardener. For example, the adhesive may include Loctite UK 3364, offered by Henkel Corporation of Westlake, Ohio. In other examples, the adhesive is a polyurethane adhesive, a fast-acting epoxy, a cyanoacrylate adhesive, or other structural adhesive.

The adhesive E bonds to the jacket 104 to axially and laterally lock the cable(s) 101 relative to the anchor member 110, 210. In certain implementations, the adhesive E bonds to the jacket 104 to rotationally lock the cable(s) 101 relative to the anchor member 110, 210. In certain implementations, the adhesive E bonds to the strength members 105 to further lock (e.g., axially, laterally, and/or rotationally lock) the cable(s) 101 relative to the anchor member 110, 210. In certain implementations, the adhesive E bonds to the carrier(s) 103 to further lock the cable(s) 101 relative to the anchor member 110, 210.

As shown in FIGS. 15-19, other components of the connector assembly 100, 200 are assembled after the adhesive E cures or sets. Optical ferrules or other alignment mechanisms may be mounted over optical fiber carriers 103. Electrical contacts may be mounted to electrical conductor carriers 103. The plug body 150, 250 is then mounted over the carrier(s) 103 and operationally coupled to the anchor member 110, 210.

Figure 21:
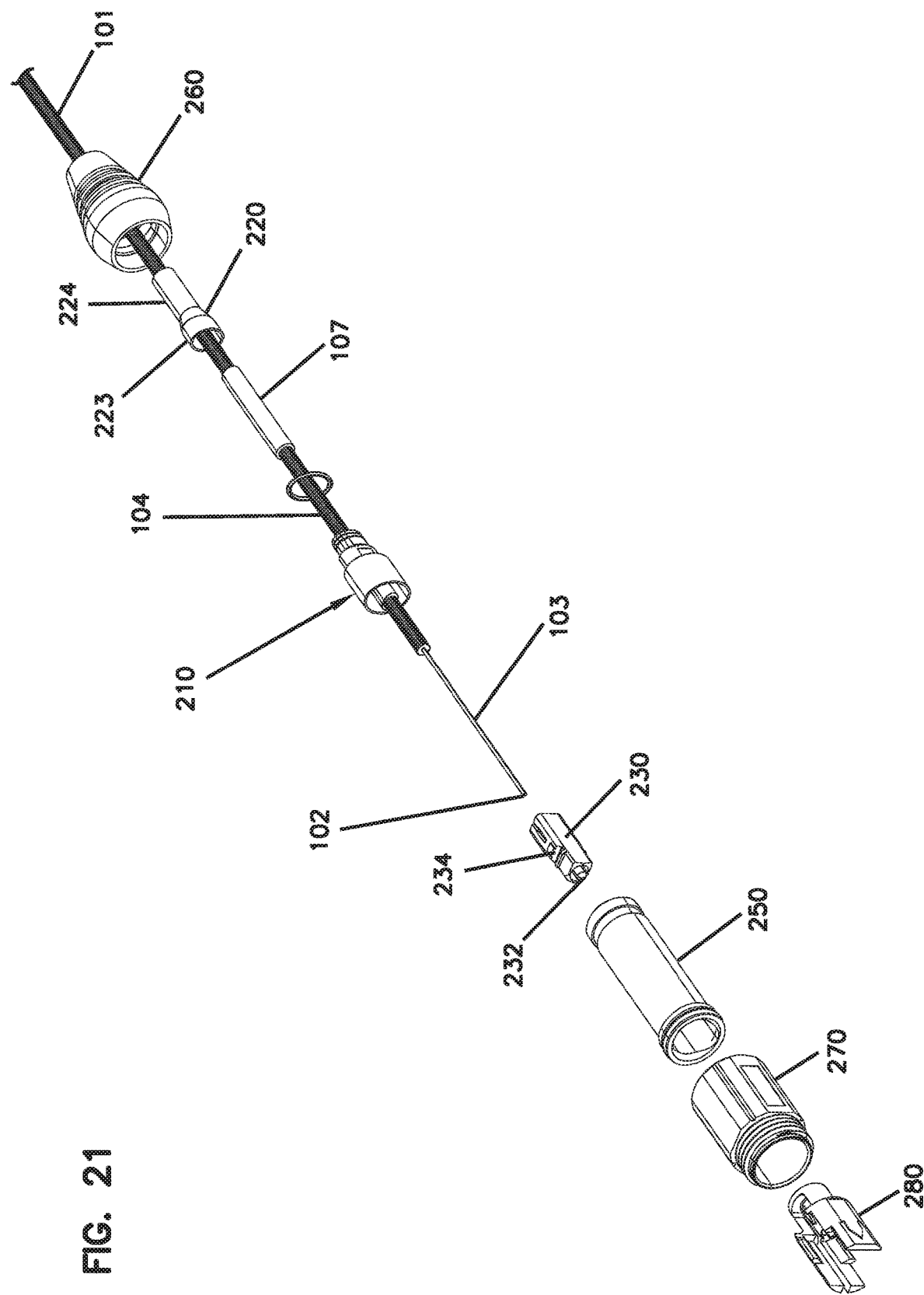
FIG. 21 is an exploded view of the second example connector assembly of FIG. 20.

In certain examples, the carrier 103 includes an optical fiber to be terminated by a ferrule assembly 130, 230. The ferrule assembly 130, 230 includes an optical ferrule 132, 232, a ferrule hub 134, 234, and a spring 136, 236 (see FIGS. 15 and 36). In certain examples, the ferrule assembly 230 also may include a surrounding housing 238 (FIG. 21). The carrier 103 is inserted into an axial passage defined through the ferrule 132, 232. The ferrule 132, 232 may be mounted to the end 102 of the optical fiber 103 before mounting the plug body 150, 250. In some examples, the cable 101 has a single optical fiber 103. In other examples, the cable 101 has multiple optical fibers. In some such examples, each optical fiber 103 is terminated at a separate ferrule 132, 232. In other such examples, two or more of the optical fibers 103 can be terminated by a common ferrule 132, 232 (e.g., a duplex ferrule, an MPO ferrule, etc.).

In certain implementations, the one or more ferrules 132, 232 and/or the end(s) 102 of the carrier(s) 103 may be polished before mounting the plug body 150, 250 to the cable 101. For example, the anchor member 110, 210 may be mounted to a polishing machine, e.g., to an anchor platform of the polishing machine. The end(s) 102 of the carrier(s) 103 extend beyond the anchor member 110, 210 to polishers of the polishing device. Because the end(s) 102 (or ferrules 132) are not held by a plug body 150, 250 or other rigid structure relative to the remainder of the cable 101, the end(s) 102 are freely movable by or relative to the polishers to facilitate polishing of the ends 102 (or ferrules 132, 232). In other implementations, end(s) 102 of one or more electrical carrier(s) 103 can be easily mounted to electrical contact elements.

In some implementations, the plug body 150 cooperates with the anchor member 110 to form the connector assembly 100 (e.g., see FIGS. 16-19). In other implementations, the plug body 250 cooperates with other components (e.g., shroud arrangement 280) to form the connector arrangement 200 around the anchor member 210 (e.g., see FIGS. 36 and 37).

As shown in FIGS. 16 and 17, a spring push 140 can be mounted to optical fiber carriers 103 after polishing of the ferrule(s) 132 or carrier end(s) 102. The spring push 140 holds the ferrule assembly 130 relative to the anchor member 110. Certain types of spring pushes 140 limit rearward axial movement of the ferrule assembly 130 relative to the anchor member 110. Certain types of spring push 140 limit lateral movement of the ferrule assembly 130 relative to the anchor member 110. As shown in FIG. 17, the spring push 140 extends through the second open end 112 of the anchor member 110.

The spring push 140 extends from a first end 141 to a second end 142. The spring push 140 defines a passage 143 extending between the first and second ends 141, 142. The spring push 140 also defines a longitudinal slit 144 extending between the first and second ends 141, 142. The longitudinal slit 144 leads from an exterior of the spring push 140 to the passage 143. The longitudinal slit 144 enables the spring push 140 to be mounted laterally over the carrier(s) 103.

As shown in FIGS. 18 and 19, the first end 141 of the spring push 140 is disposed at the internal passage member 115 within the anchor member 110 and the second end 142 abuts behind the spring 136 of the ferrule assembly 130. Accordingly, the spring 136 biases the ferrule 132 forward relative to the anchor member 110. In certain implementations, the first end 142 of the spring push 140 extends over part of the sleeve 115b of the internal passage member 115 and abuts against the base 115a of the internal passage member 115. For example, the first end 142 of the spring push 140 may seat on the shoulder 117 defined by the base 115a.

As further shown in FIGS. 18 and 19, the plug body 150 can be mounted over the carrier(s) 103 and secured to the anchor member 110. In the example shown, the plug body 150 mounts partially over the ferrule assembly 130. For example, the plug body 150 may limit lateral movement of the ferrule assembly 130 relative to the anchor member 110. The plug body 150 also may limit forward axial movement of the ferrule assembly 130 relative to the anchor member 110 (see FIGS. 18 and 19). A twist-to-lock fastener 170 (or other fastener) can be mounted over the plug body 150.

A strain-relief boot 160, 260 also can be mounted to the anchor member 110, 210 or plug body 150, 250. For example, a pre-mounted strain-relief boot 160, 260 can be slid along the cable 101 until a forward portion of the boot 160, 260 attaches to the anchor member 110, 210 or to the plug body 150, 250. In the example shown in FIGS. 18 and 19, the boot 160 attaches to the anchor member 110. In the example shown in FIGS. 36 and 37, the boot 260 has an internal rib 262 (FIG. 21) that snaps into the groove 256 defined at the first end of the plug body 250.

In certain implementations, the boot 160 is mounted to the anchor member 110 before the plug body 150. In certain examples, the boot 160 is mounted to the anchor member 110 before the adhesive E is dispensed. For example, the boot 160 may aid in holding (e.g., via clamping, friction, etc.) the conformable sleeve 120 to the anchor member 110.

In other implementations, the connector assembly 100, 200 does not include a strain-relief boot. Instead, the conformable sleeve 120, 220 provides tensile strain-relief for the cable 101.

FIGS. 20-37 illustrate another example connector assembly 200 including another example anchor member 210 for terminating the cable(s) 101. The anchor member 210 of the connector assembly 200 fits within a plug connector housing. The cable(s) 101 is prepared as described above including terminating the cable jacket 104 so that the carrier(s) 103 and optionally strength member(s) 105 extend beyond the terminated end. The second conformable sleeve 107 can be applied to the jacket 104 to smooth an external profile of the cable(s) 101.

As shown in FIG. 21, the plug connector housing includes a rear body 250 and a forward body 280. In certain implementations, the plug connector housing also may include a strain relief boot 260 that mounts to the rear body and/or a twist-to-lock fastener 270 that mounts about the plug connector housing. A ferrule assembly 230 can be held by the plug connector housing. In certain implementations, the ferrule assembly 230 includes a body that holds a ferrule at which the end 102 of the carrier 103 is terminated.

In various implementations, the connector assembly 100, 200 forms an LC connector, an SC connector, an ST connector, an FC connector, an LX.5 connector, an MPO connector, a DLX connector, an RJ-45 connector, a power cable plug, or any other desired connector.

ASPECTS OF THE DISCLOSURE

Aspect 1. A connectorization system for assembling plug connectors, the connectorization system comprising:
a plurality of cables, at least some of the cables having a different cross-dimensional shape, a different cross-dimensional size, a different number of signal and/or power carriers, or a different strength member composition than others of the cables;
a plurality of plug bodies, each plug body being associated with at least one of the cables, wherein each cable is associated with at least one of the plug bodies; and
an anchor member sized and shaped to connect a selected one of any of the cables with any of the associated plug bodies, the anchor member defining a through-passage extending between a first end of the anchor member and a second end of the anchor member, the first end of the through-passage defining a receiving region that is sized and shaped to receive a jacketed portion of any of the cables, the anchor member also being sized and shaped to couple to any of the plug bodies.

Aspect 2. The connectorization system of aspect 1, further comprising an adhesive applied through the second end of the anchor member to settle in the receiving region of the anchor member, the adhesive filling the receiving region to seal between the anchor member and the selected cable.

Aspect 3. The connectorization system of aspect 2, wherein the adhesive adheres to any strength members of the selected cable.

Aspect 4. The connectorization system of any of aspects 2 and 3, wherein the adhesive also adheres to any signal and/or power carriers of the selected cable.

Aspect 5. The connectorization system of any of aspects 1-4, further comprising a conformable sleeve configured to mount over an exterior of the anchor member at the first end and over the selected one of the cables to close the first end of the anchor member around the jacketed portion of the selected one of the cables.

Aspect 6. The connectorization system of aspect 5, wherein the conformable sleeve is a first conformable sleeve; and wherein a second conformable sleeve is mounted over the jacketed portion of the selected cable prior to mounting the first conformable sleeve over the jacketed portion of the selected cable, the second conformable sleeve smoothing an external profile of the selected cable, the first conformable sleeve contacting and sealing to the second conformable sleeve.

Aspect 7. The connectorization system of any of aspects 5-6, and preferably claims 2 and 5, wherein the conformable sleeve cooperates with the anchor member to define a filling volume into which the adhesive is dispensed, the filling volume extending beyond the receiving region of the anchor member.

Aspect 8. The connectorization system of any preceding aspect, further comprising a plurality of ferrule assemblies, each ferrule assembly being associated with one of the plug bodies.

Aspect 9. The connectorization system of aspect 8, further comprising a plurality of spring pushes, each spring push being sized and shaped to extend between the second end of the anchor member and one of the ferrule assemblies.

Aspect 10. The connectorization system of any preceding aspect, further comprising a plurality of strain-relief boots, each strain-relief boot being associated with at least one of the plug bodies, each strain-relief boot extending between a first end and a second end, the second end of each strain-relief boot being sized to fit over at least the first end of the anchor member.

Aspect 11. The connectorization system of any preceding aspect, further comprising a twist-to-lock fastening mechanism configured to fit with either the anchor member or at least one of the plug bodies.

Aspect 12. The connectorization system of any preceding aspect, wherein at least one of the plug bodies carries an external O-ring.

Aspect 13. The connectorization system of any preceding aspect, and preferably claim 2, wherein the through-passage of the anchor member is a first through-passage; and wherein the anchor member includes an internal passage member disposed in the first through-passage, the internal passage member defining a second through-passage extending between first and second ends, the first end of the second through-passage being recessed within the first through-passage.

Aspect 14. The connectorization system of aspects 13, wherein the signal and/or power carrier of the selected cable is routed through the second through-passage while any strength members remain in the first through-passage.

Aspect 15. The connectorization system of aspects 13 or 14, wherein the second through-passage remains free of adhesive.

Aspect 16. The connectorization system of any of aspects 13-15, wherein the selected cable extends sufficiently far into the anchor member so that a jacketed or buffered section of the selected cable abuts or extends into the internal passage member, wherein any signal and/or power carrier of the selected cable remains free of adhesive.

Aspect 17. The connectorization system of any of aspects 13-15, wherein a signal and/or power carrier of the selected cable is exposed in the first through-passage before reaching the second through-passage so that the signal and/or power carrier is secured to the anchor member by the adhesive.

Aspect 18. The connectorization system of any preceding aspect, wherein a strength member of at least one of the cables includes aramid yarn.

Aspect 19. The connectorization system of any preceding aspect, wherein a strength member of at least one of the cables includes GRP rods.

Aspect 20. The connectorization system of any preceding aspect, wherein a signal carrier of at least one of the cables includes an optical fiber.

Aspect 21. A method of connectorizing a first end of a cable assembly including a signal and/or power carrier and a jacket, the method comprising:

preparing the cable assembly by removing a length of the jacket at the first end of the cable assembly to expose a length of the signal and/or power carrier extending beyond a terminated end of the jacket to a distal end of the signal and/or power carrier;

inserting the first end of the cable assembly into an anchor member from a first end of the anchor member so that at least part of the signal and/or power carrier extends a distance beyond an opposite second end of the anchor member, wherein a radial gap is defined between an inner surface of the first end of the anchor member and an exterior surface of the cable assembly;

mounting a conformable sleeve over the first end of the anchor member and over a portion of the cable assembly; and dispensing adhesive at the first end of the anchor member to fill the radial gap and to anchor the terminated end of the jacket to the anchor member prior to fully assembling a connector around the signal or power carrier, the conformable sleeve creating a sufficient seal between the anchor member and the cable assembly to inhibit leaking of the adhesive.

Aspect 22. The method of aspect 21, wherein the conformable sleeve is a first conformable sleeve, and wherein the method further comprises mounting a second conformable sleeve over the cable assembly at the first end, wherein the second conformable sleeve defines the exterior surface of the cable assembly at the radial gap.

Aspect 23. The method of aspect 21, wherein the jacket defines the exterior surface of the cable assembly at the radial gap.

Aspect 24. The method of aspect 21-23, further comprising mounting the anchor member in a vertical orientation so that the first end of the anchor member faces downwardly and the second end of the anchor member faces upwardly prior to dispensing the adhesive.

Aspect 25. The method of any of aspects 21-24, wherein removing the length of the jacket also exposes a strength member of the cable assembly; and wherein the method further comprises inserting an exposed section of the strength member into the anchor member from the first end of the anchor member; wherein the adhesive anchors the strength member to the anchor member.

Aspect 26. The method of any of aspects 21-24, wherein inserting the length of the signal and/or power carrier into the anchor member includes inserting the length of the signal and/or power carrier through a separate internal passageway defined within a first through-passage extending through the anchor member.

Aspect 27. The method of aspect 26, and preferably of aspects 25 and 26, wherein the internal passageway is separated from the first through-passage along at least part of a length of the anchor member.

Aspect 28. The method of aspect 26, wherein the exposed strength member includes a rigid rod; and wherein inserting the exposed section of the strength member comprises laying the rigid rod into a channel defined at an exterior of the inner passageway.

Aspect 29. The method of aspect 26, wherein the exposed strength member includes an aramid yarn; and wherein inserting the exposed section of the strength member comprises threading the aramid yarn into the first through passage external of the inner passageway.

Aspect 30. The method of aspect 26, wherein the exposed strength member is routed through the inner passageway.

Aspect 31. The method of aspect 26, wherein the signal and/or power carrier is buffered within a tube extending through the cable assembly, the tube being routed into the inner passageway.

Aspect 32. The method of aspect 26, wherein dispensing adhesive into the anchor member comprises injecting the adhesive into the first through-passage while leaving the inner passageway free of adhesive.

Aspect 33. The method of aspect 32, wherein the terminated end of the jacket is spaced from the inner passageway along an axial gap, wherein the signal and/or power carrier is accessible along the axial gap so that the adhesive axially and laterally secures the signal and/or power carrier to the anchor member.

Aspect 34. The method of aspect 31, wherein the terminated end of the jacket is at or within the inner passageway so that the adhesive does not contact the signal and/or power carrier.

Aspect 35. The method of aspect 26, wherein dispensing the adhesive into the anchor member comprises injecting the adhesive into the inner passageway and into the first through-passage.

Aspect 36. The method of any of aspects 21-35, wherein the cable assembly includes a signal carrier including an optical fiber, and wherein the method further comprises:
  mounting a ferrule assembly on the distal end of the optical fiber, the ferrule assembly being axially and laterally movable relative to the anchor member; and
  polishing the ferrule assembly mounted on the distal end of the signal carrier before the ferrule is mounted to a connector housing to obtain a polished ferrule.

Aspect 37. The method of aspect 36, further comprising assembling a fiber optic connector at the first end of the cable assembly after polishing the ferrule assembly by operatively coupling a connector housing to the polished ferrule and to the anchor member.

Aspect 38. The method of aspect 37, wherein the connector housing is a plug body.

Aspect 39. The method of aspect 37, wherein the connector housing is a strain-relief boot.

Aspect 40. The method of aspect 36, further comprising securing the anchor member to a support base of a ferrule polishing device prior to polishing the ferrule with the ferrule polishing device, wherein the ferrule assembly remains moveable relative to the anchor member.

Aspect 41. A cable assembly comprising:
  a cable arrangement having a power and/or signal carrier, a strength member, and an outer jacket, the outer jacket being terminated so that the power and/or signal carrier and the strength member extend distally beyond a terminated end of the outer jacket;
  an anchor member extending between a first end and a second end, the anchor member defining a through-passage extending between the first and second ends of the anchor member, the through-passage defining a receiving region at the first end of the anchor member, the receiving region being laterally aligned with the terminated end of the jacket, wherein the power and/or signal carrier extends through the through-passage and outwardly beyond the second end of the anchor member; and
  cured adhesive disposed between an inner surface of the receiving region and an exterior surface of the cable arrangement so that the cable arrangement is fully surrounded by the cured adhesive, the cured adhesive also being bonded to the strength member.

Aspect 42. The cable assembly of aspect 41, wherein at least one connector body is operationally coupled to the anchor member to form a plug connector.

Aspect 43. The connectorized cable of any of aspects 41-44, wherein the anchor member includes a locking member that fits with a locking member of the at least one connector body to axially secure the anchor member relative to the connector body in at least a first direction.

Aspect 44. The cable assembly of any of aspects 42-43 wherein the connector body incudes a plug nose body coupled to the second end of the anchor member.

Aspect 45. The cable assembly of any of aspects 42-44 wherein the anchor member is disposed within the at least one connector body.

Aspect 46. The cable assembly of aspect 41, wherein the anchor member forms part of an exterior of a plug connector.

Aspect 47. The connectorized cable of any of aspects 41-47 further comprising a strain relief boot operationally coupled to the anchor member.

Aspect 48. The connectorized cable of any of aspects 41-47, further comprising a conformable sleeve providing a seal between the first end of the anchor member and an exterior surface of the cable assembly, the conformable sleeve surrounding a portion of the cured adhesive.

Aspect 49. The connectorized cable of aspect 48, and preferably of aspects 47 and 48, wherein the strain relief boot mounts over the conformable sleeve.

Aspect 50. The connectorized cable of any of aspects 41-49, wherein the cable assembly includes at least one signal carrier.

Aspect 51. The connectorized cable of aspect 50, wherein the at least one signal carrier includes an optical fiber.

Aspect 52. The connectorized cable of aspect 51, further comprising a ferrule assembly mounted to a distal end of the optical fiber.

Aspect 53. The connectorized cable of aspect 52, further comprising a spring stop that extends between the second end of the anchor member and the ferrule assembly.

Aspect 54. The connectorized cable of any of aspects 50-53, wherein the at least one signal carrier includes a plurality of optical fibers.

Aspect 55. The connectorized cable of any of aspects 50-55 wherein the at least one signal carrier includes an electrical conductor.

Aspect 56. The connectorized cable of any of aspects 50-55, wherein the cable assembly includes at least one power carrier.

Aspect 57. The connectorized cable of any of aspects 41-56, wherein the through-passage is a first through-passage; and wherein the anchor member defines a second through-passage disposed within the first through-passage.

Aspect 58. The connectorized cable of any of aspects 41-57, wherein the adhesive is Loctite UK 3364.

Aspect 59. An anchor member for use in preparing an end of a cable for connectorization, the anchor member extending along a length from a first end to a second end, the anchor member comprising:
  a body extending between the first and second ends, the body defining a first through-passage extending between openings at the first and second ends, the first though-passage filling a majority of an internal volume of the body at the first and second ends;
  a receiving region disposed at the first end of the body; and
  an internal passage member disposed within the first through-passage of the body so that a portion of the first through-passage bypasses the internal passage member, the internal passage member extending between a respective first end and a respective second end, the respective first and second ends of the internal passage member being inwardly offset from the first and second ends of the body, the internal passage member defining a second through-passage extending between openings at the first and second ends of the internal passage member.

Aspect 60. The anchor member of aspect 59, wherein the first end of the body has a first transverse cross-sectional shape and the second end of the body has a second transverse cross-sectional shape that is different from the first transverse cross-sectional shape.

Aspect 61. The anchor member of aspect 60, wherein the second transverse cross-sectional shape is circular and the first transverse cross-sectional shape is oval.

Aspect 62. The anchor member of any of aspects 59-61, wherein the body defines an exterior abutment shoulder Aspect 63. The anchor member of any of aspects 59-62, wherein the body defines an exterior latching surface.

Aspect 64. The anchor member of any of aspects 59-63, wherein the internal passage member has an oblong shape.

Aspect 65. The anchor member of any of aspects 59-64, wherein the internal passage member defines exterior channels.

Aspect 66. The anchor member of any of aspects 59-65, wherein an interior of the body has a fill stop line.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A connectorization system for assembling plug connectors, the connectorization system comprising:
    a plurality of cables, at least some of the cables having a different cross-dimensional shape, a different cross-dimensional size, a different number of signal and/or power carriers, or a different strength member composition than others of the cables;
    a plurality of plug bodies, each plug body being associated with at least one of the cables, wherein each cable is associated with at least one of the plug bodies;
    an anchor member sized and shaped to connect a selected one of any of the cables with any of the associated plug bodies, the anchor member defining a through-passage extending between a first end of the anchor member and a second end of the anchor member, the first end of the through-passage defining a receiving region that is sized and shaped to receive a jacketed portion of any of the cables, the anchor member also being sized and shaped to couple to any of the plug bodies; and
    a conformable sleeve configured to mount over an exterior of the anchor member at the first end and over the selected one of the cables to close the first end of the anchor member around the jacketed portion of the selected one of the cables, wherein the conformable sleeve cooperates with the anchor member to define a filling volume into which an adhesive is dispensed, the filling volume extending beyond the receiving region of the anchor member.

2. The connectorization system of claim 1, wherein the adhesive is applied through the second end of the anchor member to settle in the receiving region of the anchor member, the adhesive filling the receiving region to seal between the anchor member and the selected cable, wherein the adhesive adheres to any strength members of the selected cable, and/or wherein the adhesive also adheres to any signal and/or power carriers of the selected cable.

3. The connectorization system of claim 1, wherein the conformable sleeve is a first conformable sleeve; and wherein a second conformable sleeve is mounted over the jacketed portion of the selected cable prior to mounting the first conformable sleeve over the jacketed portion of the selected cable, the second conformable sleeve smoothing an external profile of the selected cable, the first conformable sleeve contacting and sealing to the second conformable sleeve.

4. The connectorization system of claim 1, further comprising a twist-to-lock fastening mechanism configured to fit with either the anchor member or at least one of the plug bodies, wherein at least one of the plug bodies carries an external O-ring.

5. The connectorization system of claim 1, wherein the through-passage of the anchor member is a first through-passage; and wherein the anchor member includes an internal passage member disposed in the first through-passage, the internal passage member defining a second through-passage extending between first and second ends, the first end of the second through-passage being recessed within the first through-passage.

6. The connectorization system of claim 5, wherein the signal and/or power carrier of the selected cable is routed through the second through-passage while any strength members remain in the first through-passage.

7. The connectorization system of claim 5, wherein the second through-passage remains free of adhesive.

8. The connectorization system of claim 5, wherein the selected cable extends sufficiently far into the anchor member so that a jacketed or buffered section of the selected cable abuts or extends into the internal passage member, wherein any signal and/or power carrier of the selected cable remains free of adhesive.

9. The connectorization system of claim 5, wherein a signal and/or power carrier of the selected cable is exposed in the first through-passage before reaching the second through-passage so that the signal and/or power carrier is secured to the anchor member by the adhesive.

10. A method of connectorizing a first end of a cable assembly including a signal and/or power carrier and a jacket, the method comprising:
    preparing the cable assembly by removing a length of the jacket at the first end of the cable assembly to expose a length of the signal and/or power carrier extending beyond a terminated end of the jacket to a distal end of the signal and/or power carrier;
    inserting the first end of the cable assembly into an anchor member from a first end of the anchor member so that at least part of the signal and/or power carrier extends a distance beyond an opposite second end of the anchor member, wherein a radial gap is defined between an inner surface of the first end of the anchor member and an exterior surface of the cable assembly;
    mounting a conformable sleeve over the first end of the anchor member and over a portion of the cable assembly; and
    dispensing adhesive at the first end of the anchor member to fill the radial gap and to anchor the terminated end of the jacket to the anchor member prior to fully assembling a connector around the signal and/or power carrier, the conformable sleeve creating a sufficient seal between the anchor member and the cable assembly to inhibit leaking of the adhesive.

11. The method of claim 10, further comprising mounting the anchor member in a vertical orientation so that the first end of the anchor member faces downwardly and the second end of the anchor member faces upwardly prior to dispensing the adhesive.

12. The method of claim 10, wherein removing the length of the jacket also exposes a strength member of the cable assembly; and wherein the method further comprises inserting an exposed section of the strength member into the anchor member from the first end of the anchor member; wherein the adhesive anchors the strength member to the anchor member.

13. The method of claim 10, wherein inserting the length of the signal and/or power carrier into the anchor member includes inserting the length of the signal and/or power carrier through a separate internal passageway defined within a first through-passage extending through the anchor member.

14. The method of claim 13, wherein the internal passageway is separated from the first through-passage along at least part of a length of the anchor member.

15. The method of claim 13, wherein dispensing adhesive into the anchor member comprises injecting the adhesive into the first through-passage while leaving the internal passageway free of adhesive.

16. The method of claim 13, wherein dispensing the adhesive into the anchor member comprises injecting the adhesive into the internal passageway and into the first through-passage.

17. The method of claim 10, wherein the cable assembly includes a signal carrier including an optical fiber, and wherein the method further comprises:

mounting a ferrule assembly on the distal end of the optical fiber, the ferrule assembly being axially and laterally movable relative to the anchor member; and polishing the ferrule assembly mounted on the distal end of the signal carrier before the ferrule is mounted to a connector housing to obtain a polished ferrule.

18. The method of claim 17, further comprising assembling a fiber optic connector at the first end of the cable assembly after polishing the ferrule assembly by operatively coupling a connector housing to the polished ferrule and to the anchor member.

19. The method of claim 17, further comprising securing the anchor member to a support base of a ferrule polishing device prior to polishing the ferrule with the ferrule polishing device, wherein the ferrule assembly remains moveable relative to the anchor member.

* * * * *